United States Patent
Mutalik et al.

(10) Patent No.: US 9,723,370 B2
(45) Date of Patent: Aug. 1, 2017

(54) SMART RECEIVERS AND TRANSMITTERS FOR CATV NETWORKS

(71) Applicant: ARRIS Enterprises, Inc., Suwanee, GA (US)

(72) Inventors: Venkatesh G. Mutalik, Middletown, CT (US); Joseph F. Chiappetta, Shelton, CT (US); Marcel F. Schemmann, Maria Hoop (NL); Shamsuddin H. Chasmawala, Middletown, CT (US)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

(21) Appl. No.: 14/683,230

(22) Filed: Apr. 10, 2015

(65) Prior Publication Data

US 2015/0295648 A1 Oct. 15, 2015

Related U.S. Application Data

(60) Provisional application No. 61/980,030, filed on Apr. 15, 2014.

(51) Int. Cl.
| | |
|---|---|
| *H04B 10/60* | (2013.01) |
| *H04N 21/61* | (2011.01) |
| *H04B 10/2575* | (2013.01) |
| *H04N 21/426* | (2011.01) |
| *H04N 21/438* | (2011.01) |
| *H04N 21/442* | (2011.01) |

(Continued)

(52) U.S. Cl.
CPC ....... *H04N 21/615* (2013.01); *H04B 10/0795* (2013.01); *H04B 10/07951* (2013.01); *H04B 10/25751* (2013.01); *H04B 10/697* (2013.01); *H04N 21/42607* (2013.01); *H04N 21/438* (2013.01); *H04N 21/44209* (2013.01); *H04N 21/6118* (2013.01)

(58) Field of Classification Search
CPC .......... H04B 10/2507; H04B 10/25751; H04B 10/60; H04N 21/42607; H04N 21/438; H04N 21/44209; H04N 21/6118; H04N 21/615
USPC .......................................... 398/159, 202–214
See application file for complete search history.

(56) References Cited

U.S. PATENT DOCUMENTS

| | | | | |
|---|---|---|---|---|
| 5,340,979 A | * | 8/1994 | Baney | ........................ G01J 1/42 |
| | | | | 250/214 A |
| 5,418,637 A | * | 5/1995 | Kuo | ......................... H04B 3/06 |
| | | | | 398/159 |

(Continued)

FOREIGN PATENT DOCUMENTS

| | | |
|---|---|---|
| EP | 1109338 A2 | 6/2001 |
| WO | 01/26256 A1 | 4/2001 |
| WO | 01/50642 A1 | 7/2001 |

OTHER PUBLICATIONS

Yamazaki et al, A Coherent Optical FDM CATV Distribution System, Mar. 1990, JLT, pp. 396-405.*

(Continued)

*Primary Examiner* — Ken N Vanderpuye
*Assistant Examiner* — Dibson Sanchez
(74) *Attorney, Agent, or Firm* — Thomas A. Ward

(57) ABSTRACT

A smart receiver and smart transmitter for CATV networks where distortion is minimized using a spectrum analyzer.

15 Claims, 15 Drawing Sheets

(51) Int. Cl.
*H04B 10/69* (2013.01)
*H04B 10/079* (2013.01)

(56) References Cited

U.S. PATENT DOCUMENTS

| | | | | | |
|---|---|---|---|---|---|
| 5,481,389 | A * | 1/1996 | Pidgeon | ............. | H03F 1/32 332/160 |
| 5,521,751 | A * | 5/1996 | Aida | ............. | H01S 3/06754 359/337 |
| 5,526,158 | A * | 6/1996 | Lembo | ............. | H04B 10/64 398/183 |
| 5,677,781 | A * | 10/1997 | Mori | ............. | H04B 10/0731 359/341.1 |
| 5,712,716 | A * | 1/1998 | Vanoli | ............. | H04B 10/077 398/26 |
| 2002/0123851 | A1* | 9/2002 | Kurooka | ............. | H04B 10/2513 702/69 |
| 2003/0042402 | A1* | 3/2003 | Boertjes | ............. | H04B 10/673 250/214.1 |
| 2003/0043440 | A1* | 3/2003 | Suzaki | ............. | H04B 10/6971 398/202 |
| 2004/0037572 | A1* | 2/2004 | Matsuyama | ............. | H04B 10/2572 398/202 |
| 2004/0105682 | A1* | 6/2004 | Roberts | ............. | H04B 10/2572 398/147 |
| 2004/0218931 | A1 | 11/2004 | Frederiksen et al. | | |
| 2005/0117916 | A1* | 6/2005 | Kropp | ............. | H04B 10/077 398/202 |
| 2006/0034622 | A1* | 2/2006 | Day | ............. | H03F 1/32 398/208 |
| 2007/0009266 | A1* | 1/2007 | Bothwell | ............. | H04B 10/2581 398/161 |
| 2007/0098417 | A1* | 5/2007 | Peral | ............. | H03F 1/3241 398/208 |
| 2009/0074419 | A1* | 3/2009 | Pappert | ............. | H04B 10/25137 398/91 |
| 2009/0113511 | A1 | 4/2009 | Lee | | |
| 2009/0116844 | A1* | 5/2009 | Tanaka | ............. | H04B 10/6971 398/115 |
| 2010/0158541 | A1* | 6/2010 | Tsunoda | ............. | H04B 10/6971 398/208 |
| 2010/0329698 | A1* | 12/2010 | Nakashima | ............. | H04B 10/60 398/208 |
| 2011/0255879 | A1* | 10/2011 | Xie | ............. | H04B 10/2513 398/208 |
| 2013/0084080 | A1* | 4/2013 | Shibutani | ............. | H04B 10/6161 398/208 |
| 2013/0286847 | A1* | 10/2013 | Schmidt | ............. | H04J 14/0276 370/241 |
| 2013/0287390 | A1* | 10/2013 | Abe | ............. | H03H 17/0202 398/26 |
| 2014/0037286 | A1 | 2/2014 | Krasulick et al. | | |

OTHER PUBLICATIONS

PCT Search Report & Written Opinion, Re: Application No. PCT/US2015/025359; dated Jun. 26, 2015.

* cited by examiner

SMART RECEIVERS AND TRANSMITTERS FOR CATV NETWORKS

CROSS-REFERENCE TO RELATED APPLICATIONS

This application claims priority to U.S. Provisional Application Ser. No. 61/980,030 filed on Apr. 15, 2014.

BACKGROUND OF THE INVENTION

The subject matter of this application relates to systems and methods that provide optical signals over a cable transmission network.

Early CATV systems were configured to deliver content along a coaxial transmission path from a content provider to its subscribers. As these systems evolved to not only provide a greater amount of content, but to provide data services that travel to and from the subscriber (e.g. Internet service), much of the coaxial path from the provider to the subscribers was replaced with fiber-optic cable, which could transmit a signal over a greater distance with less intermediate amplification. Such systems are typically referred to as hybrid-fiber coax (HFC) systems because the majority of the transmission between a head end that sends a signal and a customer that receives a signal is propagated along optical fiber, except for the short distances proximate the customers' premises, which is coaxial.

Fiber optic communication systems offer many advantages, including high data transfer rates and substantial immunity to electromagnetic interference. Networks that can integrate fiber optics for data transfer, such as cable television (CATV) networks, can increase performance for the consumer. However, it is generally expensive to lay fiber optic cable, especially in dense metropolitan areas. This has led to increasing demands for higher data rates on existing fiber, and attempts to send light down longer stretches of fiber. Technologies for increasing the data rate of fiber optic communication include Course Wave Division Multiplexing (CWDM) and Dense Wave Division Multiplexing (DWDM).

A typical optical system may operate with cable television (CATV) RF carrier frequencies, such as National Television System Committee (NTSC) RF carrier frequencies. In an optical link that is transporting many radio frequency (RF) carrier channels, there exists composite second order distortion (CSO) components. The CSO components result from inherent nonlinearity of the link components, laser chirp interactions, dispersion along the fiber, and other effects. CSO degrades performance of the CATV network and therefore, improved techniques for reducing CSO distortions in a CATV network are desirable.

BRIEF DESCRIPTION OF THE DRAWINGS

For a better understanding of the invention, and to show how the same may be carried into effect, reference will now be made, by way of example, to the accompanying drawings, in which.

DETAILED DESCRIPTION

Figure 1A:
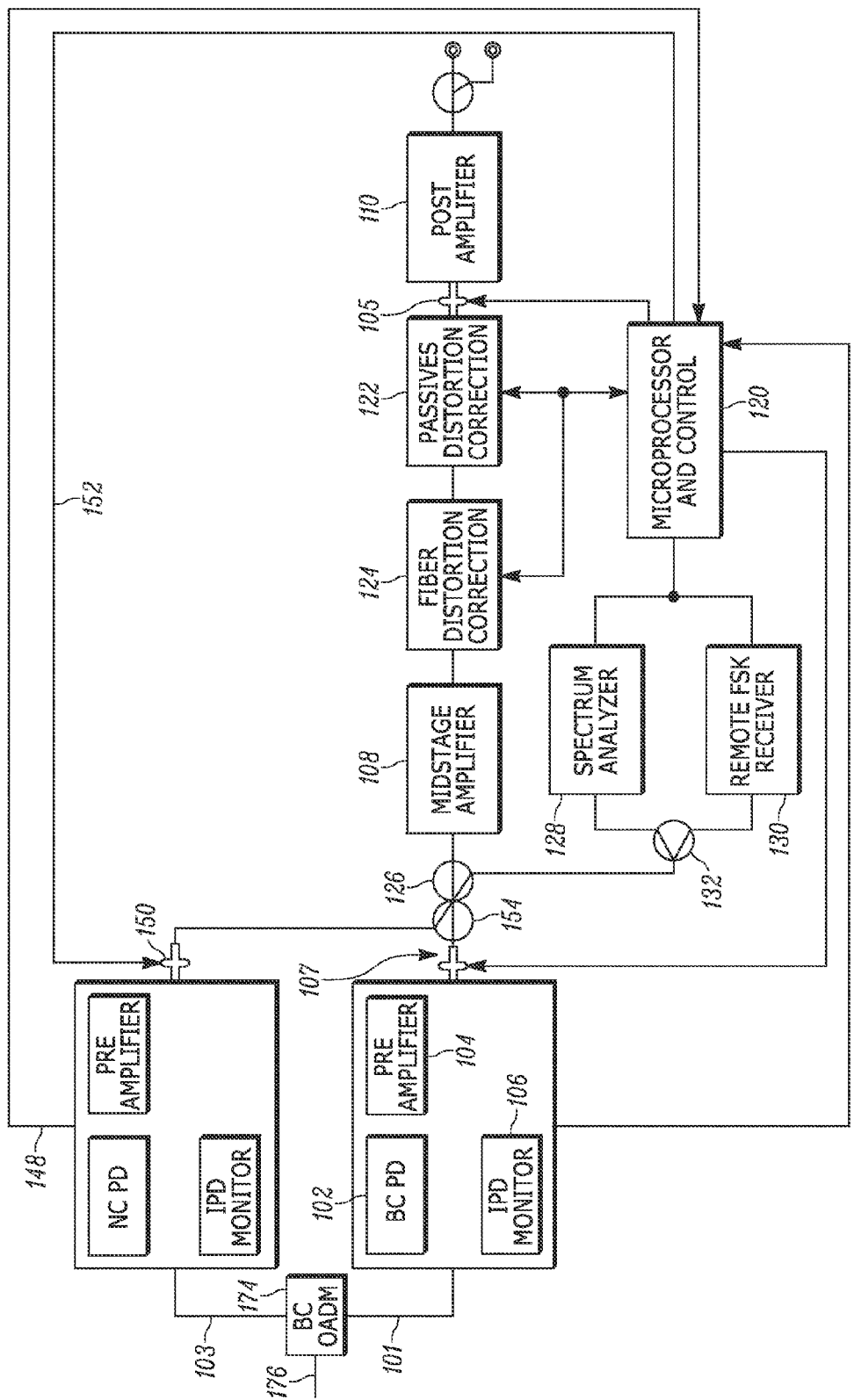
FIG. 1A shows an exemplary optical dual receiver receiving both a broadcast signal and a narrowcast signal.

As previously noted, demand for higher bandwidth in CATV networks is continually growing to support applications such as IP data, high definition TV and video on demand. To meet this demand, HFC networks are being upgraded to provide wavelength division multiplexing (WDM) over existing fiber rather than providing more cable, since the latter is cost-prohibitive. WDM, in turn typically requires optical transmission at 1550 nm wavelengths—a wavelength that also has the benefit of reducing attenuation losses along the length of the fiber. Unfortunately, optical transmission from a directly modulated laser transmitter at the 1550 nm wavelength is prone to high levels of composite second order (CSO) distortion in the fiber due to interaction between laser chirp and dispersion of the optical signal within the fiber. These CSO distortions impair SNR performance of the CATV network, particularly as fiber length between transmission points increases.

Chirp is an unintended variance in frequency at the output of a laser. Chirp occurs when a laser's current is changed to provide the signal being propagated; the laser's carrier density changes and therefore results in a time-dependent phase change, where variations in a signal output from a laser is accompanied by modulations in frequency. Chirp is highly unpredictable, having characteristics that not only vary from one laser to another, but also changes at the output of a given laser based on RF loading and bias current.

Dispersion (the spatial distortion of an optical signal traveling over a fiber-optic cable) can be either modal dispersion, chromatic dispersion, or polarization mode dispersion. Modal dispersion results from the different speeds at which light travels through different fiber modes, and can be eliminated by using single mode fiber. Chromatic dispersion refers to the different traveling time for different wavelengths in the fiber, due to the differing propagation speeds at the respective wavelengths. Though some lasers can emit light in very narrow spectral bands, no laser can emit light at a single, monochromatic wavelength, hence chromatic dispersion will always occur. Polarization mode dispersion results from the difference in propagation constants of a fiber optic cable due to imperfections in its geometry. Dispersion is particularly limiting when seeking to expand CATV content delivered over a fiber optic cable using techniques such as wavelength division multiplexing (WDM).

Different techniques may be used to reduce these CSO distortions, but each has disadvantages. For example, some compensatory techniques attempt to pre-distort the input signal to a laser so as to cancel the CSO resulting from laser chirp and dispersion. Such pre-distortion techniques require advance knowledge of chirp characteristics of a laser along with the fiber length along which the laser transmits. However many existing networks maintain redundant routes, generally accomplished by optically splitting a signal from a transmitter along different routes, each having a different optical fiber lengths. When transmission along one route is degraded, interrupted, etc. transmission along the other route provides the signal. However, because changes from one route to another cannot be anticipated, the transmitter cannot compensate for the new fiber length, which results in distortion and SNR degradation.

Another technique that compensates for CSO distortions due to laser chirp and dispersion replaces a directly modulated laser with an indirectly or externally modulated laser. Two typical types of external modulators are Mach-Zehnder modulators and electro-absorption modulators (EAMs). A Mach-Zehnder modulator receives an incoming optical signal and splits it equally, sending the split signals down two respectively different optical paths. After a certain distance, the two paths recombine, causing the optical waves to interfere with each other. Such an arrangement is known as an interferometer. The phase shift between the two optical signals is controlled by changing the delay through one or both of the optical paths by means of the electro-optic effect. If the phase shift between the two waves is 0° then the interference is constructive and the light intensity at the output is high (on state); if the phase shift is 180° then the interference is destructive and the light intensity is zero (off state).

An EAM consists of an active semiconductor region sandwiched in between a p- and n-doped layer, forming a p-n junction. The EAM works on the principle known as Franz-Keldysh effect, according to which the effective bandgap of a semiconductor decreases with increasing electric field. Without bias voltage across the p-n junction, the bandgap of the active region is just wide enough to be transparent at the wavelength of the laser light. However, when a sufficiently large reverse bias is applied across the p-n junction, the effective bandgap is reduced to the point where the active region begins to absorb the laser light and thus becomes opaque. Thus, an EAM may be effectively used to selectively pass or absorb light emitted by a laser depending on the voltage applied across the p-n junction of the EAM.

Because the electric field in the active region not only modulates the absorption characteristics, but also the refractive index, the EAM produces some chirp. However, this chirp usually is much less than that of a directly-modulated laser. The combination of a laser with an EAM is typically referred to as an Electro-Absorption Modulated Laser (EML). Though EMLs offer easy integration, low driving voltage and power dissipation, the modulator inherently introduces nonlinear distortions (second order and higher) in the modulated optical signal which results in bit error rate (BER) performance degradation. These distortions vary strongly as a function of the bias point of the EAM, and therefore the precise point where distortions are minimized is set differently for different lasers. Though some pre-distortion techniques can be used to further correct for residual laser distortion that occurs even after selection of an optimal bias point, such approaches are often costly due to the difficulty in precisely setting the bias to an optimal point and holding the bias to that point. Furthermore, while less expensive than Mach-Zehnder modulators, EMLs are still more expensive than directly modulated lasers. Also, externally modulated lasers may not be available at all wavelengths of interest.

Still other techniques to reduce CSO distortions caused by chirp and dispersion select optical components that are "flat"—i.e., have a loss that is wavelength-independent in the pass band of the optical filter across the area of interest and do not interact with chirp. However, such optical components tend to be expensive and have a longer lead time.

The present application discloses techniques for dynamic minimization of CSO distortions in a CATV network. In some embodiments, a circuit is disclosed that implements dynamic minimization of CSO distortions at a receiver, rather than at a transmitter. Such disclosed circuits may enable the use of directly modulated laser transmitters while achieving a performance similar to that of externally modulated laser transmitters, such as EMLs and Mach-Zehnder modulators. In some embodiments, the disclosed circuits may be configured to include a function that dynamically cancels or otherwise reduces optical filter distortions in HFC networks. In some embodiments, the design of the disclosed circuit is configured for dynamic fiber distortion cancellation in HFC networks. In some embodiments, the disclosed circuit design is configured for dynamic per-channel RF power management in HFC networks. In some embodiments, the disclosed circuit design is configured for dynamic and novel Broadcast/Narrowcast (BC/NC) overlay setup and management in HFC networks.

FIG. 1A shows a dual channel optical receiver 100 having two optical to electrical signal converters, one of which consists of a photodiode 102, an IPD (photodiode current) monitor 106, a pre-amplifier 104, a mid-stage amplifier 108, and a post-amplifier 110. The receiver 100 may be an automatic gain control (AGC) receiver for handling an input signal with an amplitude that can vary over a wide dynamic range. An AGC receiver, for example, can provide a relatively constant output amplitude so that equipment following the AGC receiver requires less dynamic range.

An incoming signal 101, i.e., an optical signal, i.e., light, is input to a photodiode 102. The photodiode 102 converts the optical signal and its corresponding optical distortions to electronic signals, e.g., RF electrical signals. An optical power monitor, such as the IPD monitor 106, which monitors the photodiode current ($I_{PD}$), may be used to monitor optical power delivered to the receiver from a transmitting laser by producing and scaling a voltage proportional to the received current. The scaled voltage is an indirect measurement of the optical output power of the laser and therefore can be used to determine the efficiency of the delivery of laser power to the receiver over its operational temperature range.

Figure 1B:
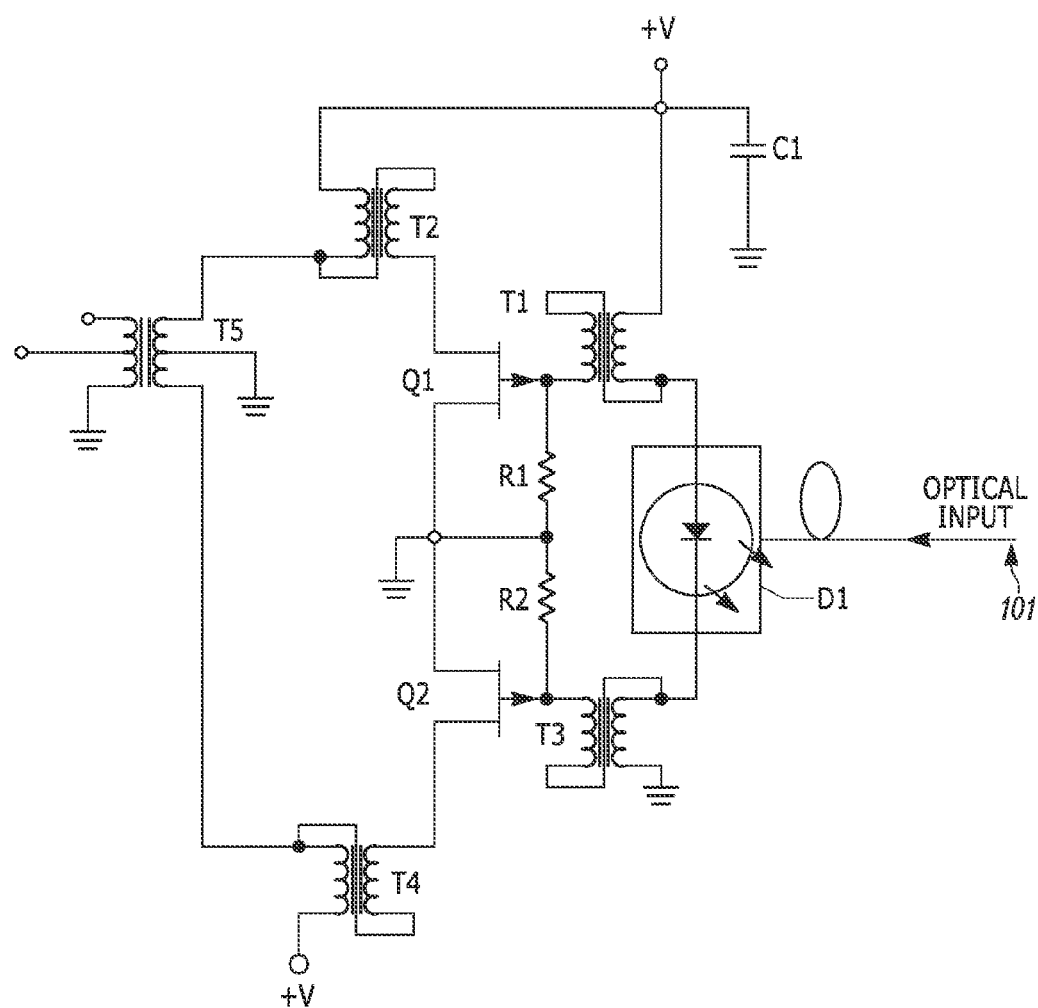
FIG. 1B shows an exemplary preamplifier used ion the receiver of FIG. 1.

The RF output signals and the distortion components from the photodiode 102 may be amplified by an RF input pre-amplifier 104. An exemplary diagram of a pre-amplifier is shown in FIG. 1B, and includes transistors Q1, Q2, resistors R1 and R2, capacitor C1, and transformers T1 through T5. Resistors R1 and R2 provide the bias voltage for transistors Q1 and Q2. Capacitor C1 decouples power supply noise from the circuit. In some embodiments, the circuit of FIG. 1B is rated at an output conversion efficiency of 50 mV/mW. This balanced configuration may be employed to provide second order reduction of RF distortion components that may be generated by this particular amplification stage.

In one embodiment of the receiver 100 of FIG. 1A, the optical input 101 may have levels of 0 to 3 dBm, which are converted to generate a signal with a noise floor of 7 pA/rtHz by the photodiode 102. In an alternate low noise embodiment, the optical input signal 101 may be between −3 to 0 dBM such that the photodiode 102 is coupled to a low noise amplifier series (pre-mid- and post-amplifiers) such that the receiver 100 has an input equivalent thermal noise to generate an output of 4.5 pA/√Hz. In still another ultra-low noise embodiment, the optical input signal 101 may be between −10 dBm and 0 dBm, such that the equivalent input thermal noise at the photodiode is 3 pA/√Hz.

The output of the pre-amplifier 104 may be provided to a mid-stage amplifier 108. In some embodiments, an attenuator 107 may attenuate the signal provided to the mid-stage amplifier 108. The output from the mid-stage amplifier 108 may be provided to a post amplifier 110, which again in some embodiments may be first attenuated. In such an embodiment of a basic optical AGC receiver as shown in FIG. 1A, light is received by a photodiode, whereupon the photodiode current is calibrated and measured. In some embodiments, a front-end gain provided by the pre-amplifier 104 may be set to ensure that the Receiver Front End will always be configured to deliver a signal equivalent to a 0 dBm RF level, or some other desired optical level value. For example, the front-end gain could be set according to the equation Front End GAIN=−20*LOG(*IPD*)

It should be understood by those skilled in the art that the exact RF level could differ depending on the type of transmitter, due to the specific optical modulation index (OMI) and RF Loading of the transmitter, which the Optical AGC receiver 100 shown in FIG. 1A will not affect.

Preferably, the receiver 100 is configured so that the IPD monitor 106 communicates with the post amplifier via a microprocessor and control 120. The microprocessor and control 120 may output a signal to an attenuator 107 at the output of the preamplifier 104 or 105 at the input of the post-amplifier 110. The microcontroller monitors the current from the IPD monitor 106 and uses this information to adjust the loss before the post amplifier in order to compensate for changes in monitor current.

Preferably, the receiver 100 includes optical passive distortion cancellation circuitry 122 that cancels passive distortion, i.e. distortion that results from a waveform having an amplitude that is not constant with changes in wavelength. Also, the receiver 100 preferably includes fiber distortion cancellation circuitry 124 located between the passive distortion cancellation circuitry 122 and the mid-stage amplifier 108. The fiber distortion canceling circuitry 124 may correct for distortion resulting from fiber dispersion, for example. Preferably, both the passive distortion cancellation circuitry 122 and the fiber distortion canceling circuitry 124 receive an input from the microprocessor and control 120 to adjust the amount of distortion corrected by the respective circuitry 122 and 124.

Preferably, the microprocessor 120 may attenuate a received signal independently controlling the variable attenuator 105 and the variable attenuator 107. In this manner, the microprocessor 120 may adjust the attenuator 107 to ensure that the midstage amplifier 108 is not overdriven while also adjusting, as necessary, the attenuator 105 to ensure that the post amplifier 110 is not overdriven. At the same time, the microprocessor 120 may keep the input level to the distortion canceling circuits 122 and 124 relatively constant, irrespective of variations in the input levels to the photodiode 102. Those of ordinary skill in the art will appreciate, however, that in some embodiments the microprocessor 120 may variably control only a selective one of an attenuator 105 and an attenuator 107.

Preferably, the receiver 100 is configured as a spectrum tuner receiver by including a splitter 126 and a spectrum analyzer 128. The splitter 126 receives an input from the pre-amplifier 104 and attenuator 107. The splitter 126 provides an input to the spectrum analyzer 128, and the spectrum analyzer 128 provides an input to the microprocessor and control 120. Furthermore, the receiver 100 preferably includes a Frequency Shift Keying (FSK) receiver 130 and a splitter 132, which is connected to both the spectrum analyzer 128 and remote FSK receiver 130, both of which provide an input to the microprocessor and control 120.

Some embodiments of the receiver 100 may use only a single photodiode 102. Conversely, however, some embodiments of the receiver 100 may be configured as a dual receiver that includes a second photodiode 142 coupled to a second pre-amplifier 144 and a second IPD monitor 146. Thus, two optical signals 101 and 103 may be input to the receiver 100. The IPD monitor 146 is communicatively coupled to microprocessor 120 via connection 148, microprocessor 120 is communicatively coupled to a variable attenuator 150 via connection 152. A component combiner 154 receives an input from variable attenuator 150 and variable attenuator 107. Further, the microprocessor and control 120 provides an input to variable attenuator 105.

Figure 2A:
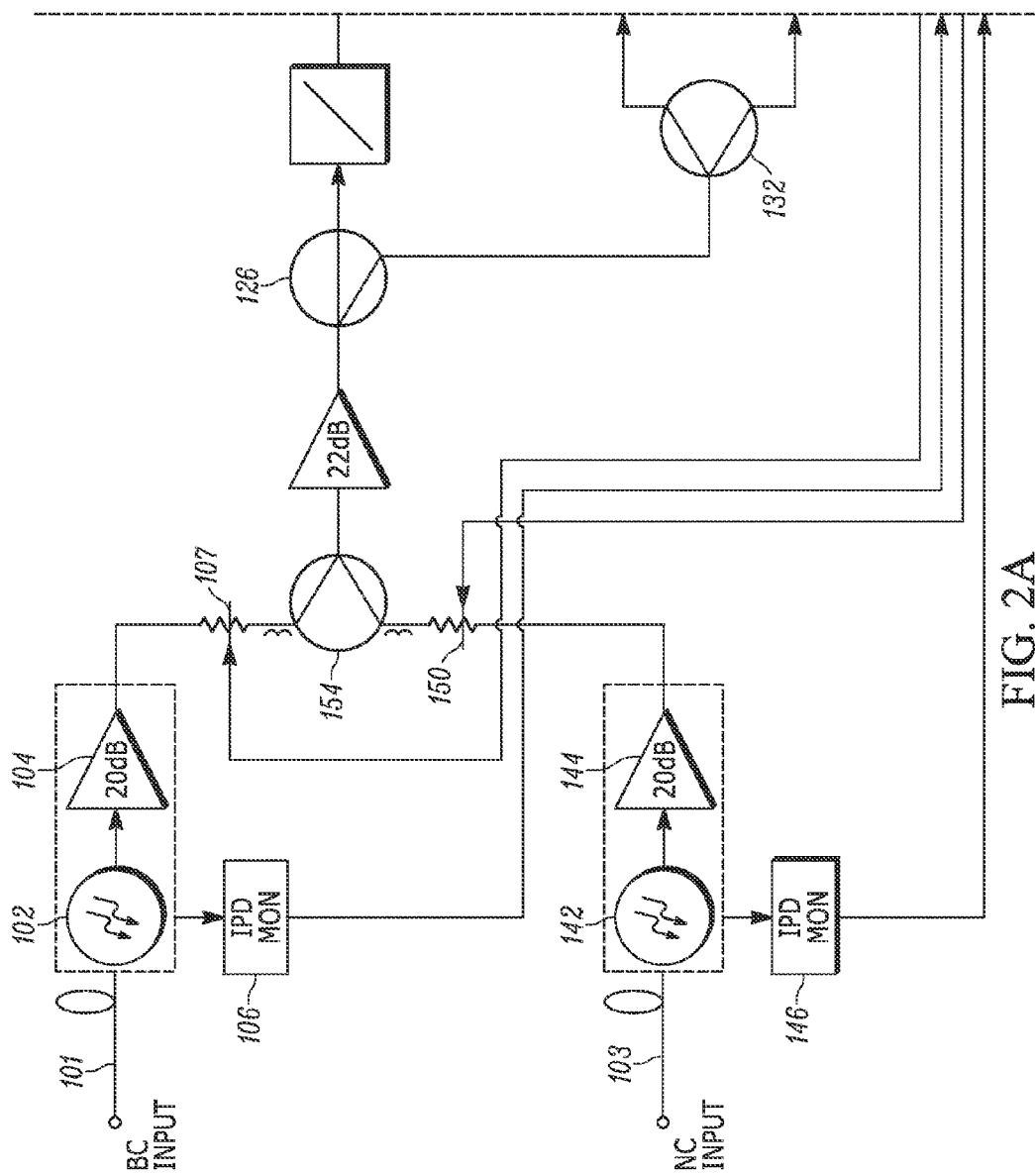
FIGS. 2A and 2B show a first portion and a second portion, respectively, of a block diagram of circuitry implementing the receiver of FIG. 1.
Figure 2B:
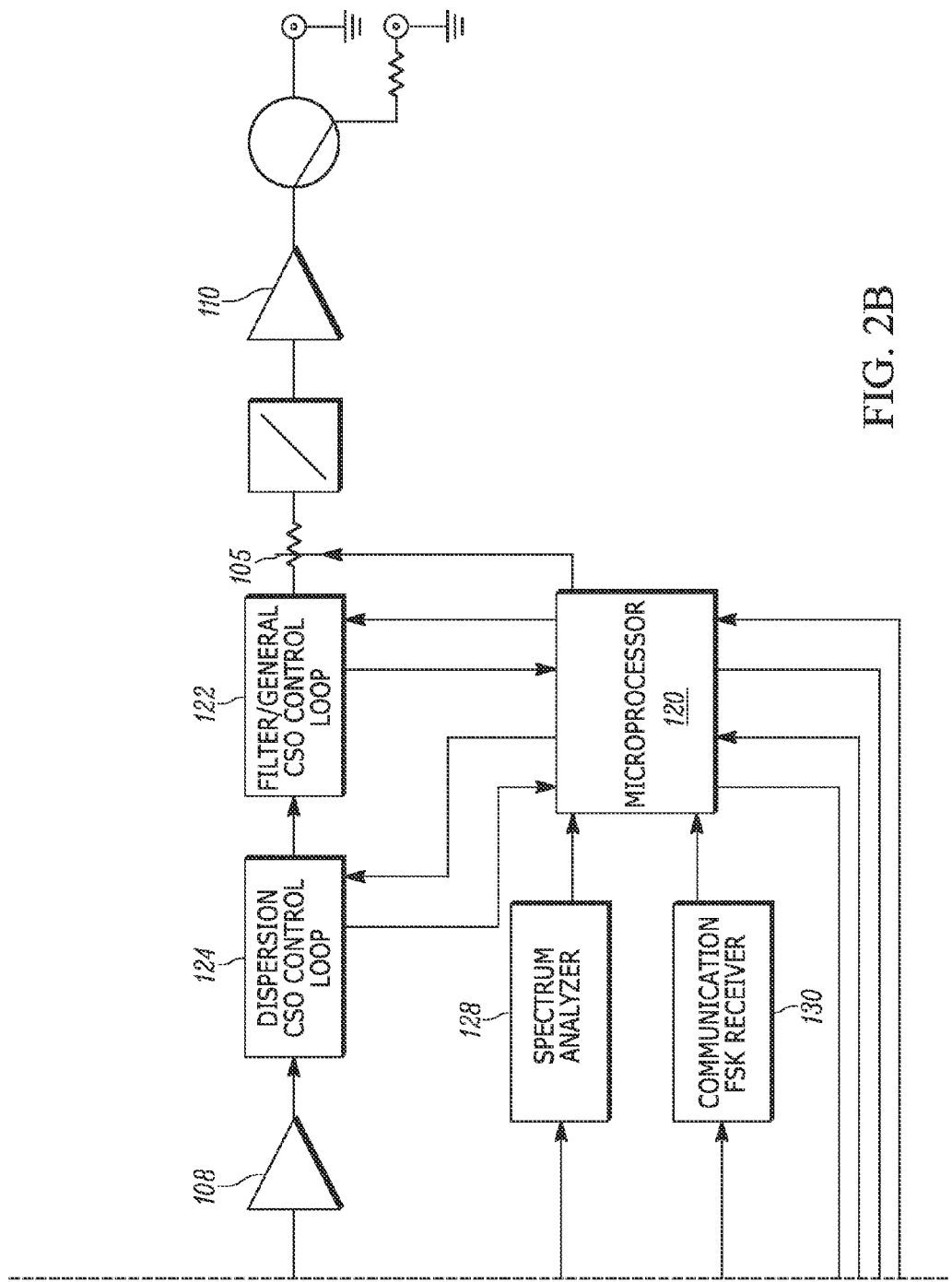

FIGS. 2A and 2B depict a first portion and a second portion, respectively, of a block diagram of the circuitry implementing the receiver 100 by, for example, showing specific amplifiers that may be used to accomplish the functionality of the dual receiver of FIG. 1A.

Figure 3A:
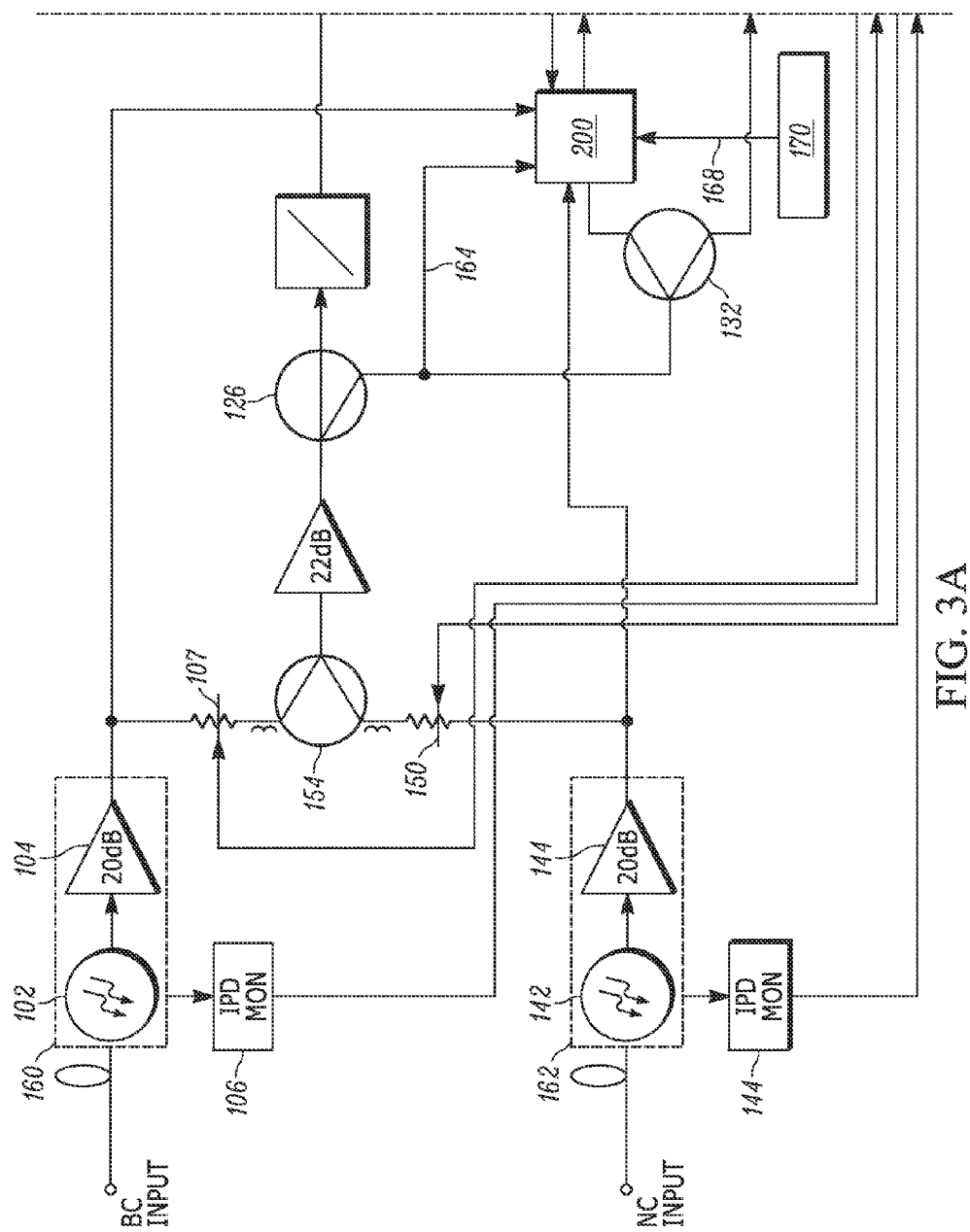
FIGS. 3A and 3B show a first portion and a second portion, respectively, of the receiver of FIG. 1A with a multi-position switch to a spectrum analyser.
Figure 3B:
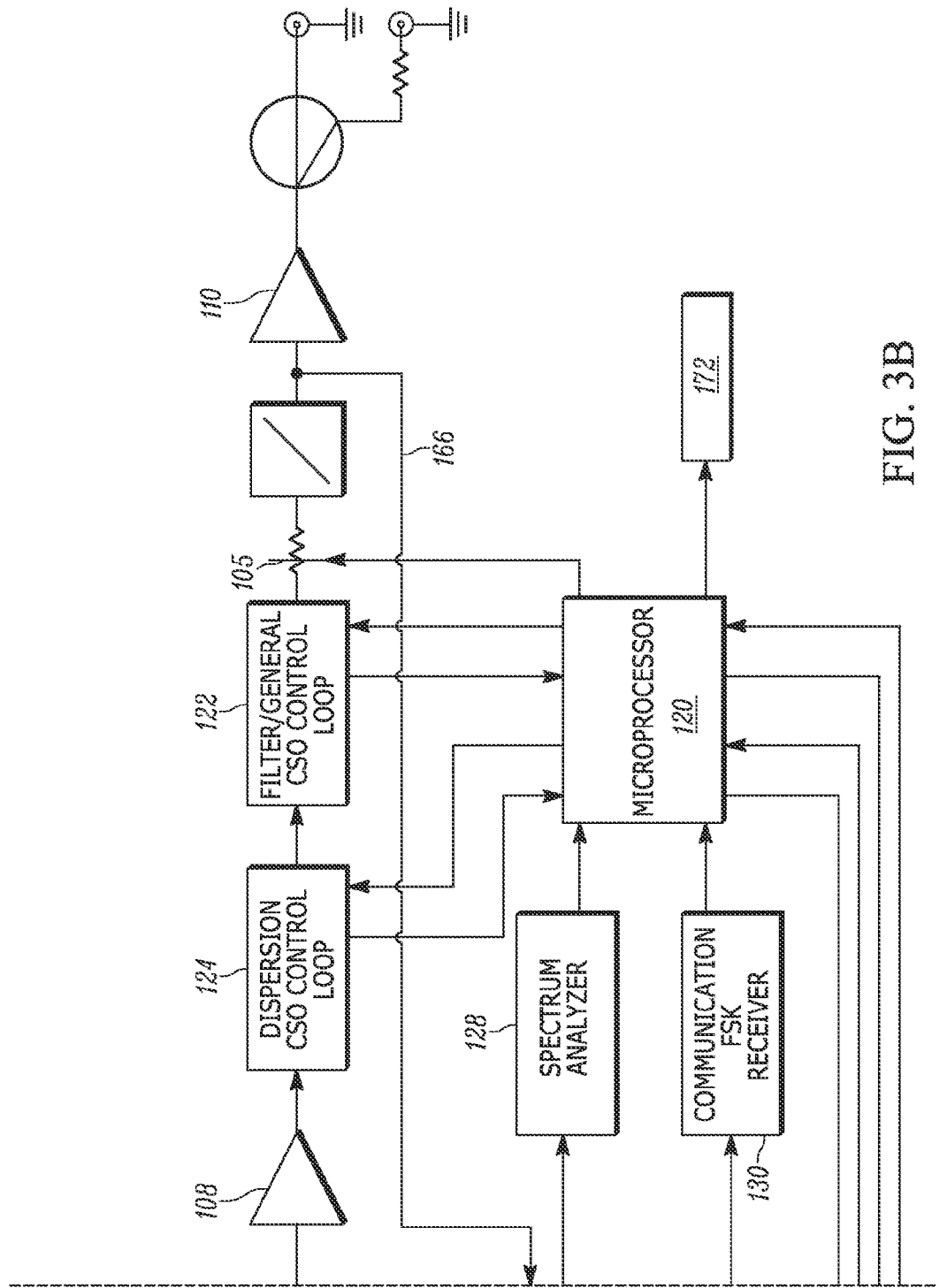

FIGS. 3A and 3B show a first portion and a second portion, respectively, of an alternate embodiment of the receiver 100, but with additional components such as the multi-position switch 200 added between an RF signal splitter or switch 132 and the spectrum analyzer 128. The multi position switch 200 is a toggle switch with multiple positions, e.g., a five-position multi-position switch. The inputs may include inputs from: (1) a first receiver 160— e.g., a broadcast (BC) receiver having photodiode 102; (2) a second receiver 162—e.g. a narrowcast (NC) receiver having photodiode 142; (3) a combined signal (e.g. BC/NC signal) 164; (4) the signal 166 of the receiver just after the distortion cancellation circuits 122, 124; and/or (5) the signal 168 from an output tap of a node 170. Any of these inputs can be selected to be sent to the spectrum analyzer 128. For example, the multiple-position switch 200 can direct a BC signal, a NC signal or the combined BC/NC signal to the spectrum analyzer 128. The multi position switch may also select as an input the receiver output 166 and/or a node output tap 168. Any results of the spectrum analyzer are provided to the microprocessor 120, which may communicate with an existing element management system (EMS) 172 that can send information upstream, such as to the head end. The EMS 172 has a return communication channel. As a result of the inputs to the switch 200 that can be selected for analysis by the spectrum analyzer 128, the receiver 100 is capable of performing several novel functions as disclosed herein.

Those of ordinary skill in the art will appreciate that the dual receiver 100 shown in FIGS. 1-3 may be configured to receive a broadcast/narrowcast signal from a broadcast/narrowcast overlay network. For example, the embodiment in FIG. 1A includes a broadcast wavelength optical add-drop multiplexer (OADM) input 174 for receiving a combined broadcast/narrowcast input 176 from a BC/NC overlay network. Numerous narrowcast wavelengths are supported along with the broadcast services on just one fiber input 176 to the broadcast wavelength OADM 174. Thus, one receiver may receive a combined BC/NC combined signal.

The OADM 174 is a device that may be used in wavelength-division multiplexing systems for multiplexing and routing different channels of light into or out of a single mode fiber (SMF), which is a type of optical node generally used in optical telecommunications networks. The terms "add" and "drop" refer to the capability of the device to add one or more new wavelength channels to an existing multi-wavelength WDM signal, and/or to drop (remove) one or more channels, passing those signals to another network path. The use of the BC wavelength OADM 174 is not onerous due to the fact that the broadcast portion can be separated from the narrowcast portion.

Referring again to FIGS. 3A and 3B, the multi-position switch 200 may receive several inputs and may select from among them to send a selected input signal to the spectrum analyzer. In addition to standard measurements that may be made by the spectrum analyzer, the disclosed embodiments enable the use of the spectrum analyzer for system monitoring, such as noise analysis. Described below are examples of impairments that may be determined by analyzing information collected by use of the switch 200 and the spectrum analyzer 128. Multi-wavelength systems are complex, and the ability to extract information from the system for monitoring/troubleshooting is useful. Disclosed are novel embodiments enabling system monitoring abilities through components integrated into the receiver. Exemplary system monitoring abilities include: (1) analysis of low frequency spectrum (<50 MHz) for each of the input signals switched to the spectrum analyzer; (2) determining the presence of Stimulated Brillouin Scattering (SBS) in transmitter output using a detected presence of a large degree of low frequency noise, which is tagged and an SBS Alert issued; (3) determining the presence of 4 WM or bad passives in system through the detected presence of a large degree of low frequency noise without strong frequency dependence; and (4) measurements of the RF levels of the pilot tones at 40 MHz and 1.25 GHz, which are set at an appropriate OMI, and could be used as reference for any of the other system monitoring abilities just mentioned.

If there is noise in low frequency bands, then distortion is likely present. For example, optical communications systems utilize pulses of light comprising the transmitted optical signals, through fiber optic cables, thereby transmitting information between devices. If the optical power input to a fiber in the optical communication system is too high, a phenomenon known as Stimulated Brillouin Scattering (SBS) may occur. With SBS, a portion of the light input to the fiber is reflected and the power level of the light transmitted through the fiber is reduced below the intended input power level, among other deleterious effects. SBS can reduce the quality of the signal output from the fiber and thereby affect the performance of a communication system.

Consider, for example, a spectrum below the CATV band (e.g., below 50 MHz)—if a high level of noise is present at low frequencies, the amount of SBS suppression of the signal from the transmitter located in the head end may be inferred. Thus, the information enabled by including the switch 200 into a receiver may be used to detect SBS, which can be reported to the head end, for example via EMS 172 shown in FIG. 3. Previously, SBS was identified based on reflected light at the transmitter. Thus, the disclosed receiver is able to detect SBS in the disclosed embodiments and report information pertaining to it to the head end.

Furthermore, using the disclosed receiver to identify noise allows detection of other signal impairments, such as impairments due to four wave mixing (4 WM), wavelength drift, or bad optical passives/optical link. For example, some embodiments of the disclosed system may analyze the high frequency spectrum (e.g. >1.2 GHz) for any of the signals switched to the spectrum analyzer 128. The presence of noise above this selected frequency band may indicate the presence of 4 WM in system, or a high degree of CSO distortions in the fiber.

At higher frequencies, for example above the CATV band, e.g., above 1.2 GHz, 4 WM may be a substantial impairment to the system, which is a function of wavelength planning. If wavelength planning is improper, the arrangement of wavelengths in the system may cause an impairment, such as a substantial amount of forward mixing of multiplexed QAM wavelengths. Generally, the transmitter or receiver is not the source of the improper wavelength planning, but is a function of the varying wavelengths in the system, and generally is nearly impossible to detect unless a four wave mixing test is conducted, which tests for a significant amount of RF noise in the outside band, indicating forward mixing. The tests that are currently available, such as detecting Optical Beat Interference (OBI) in the context of high squelch, may test for a significant amount of RF noise. This, however, does not detect four wave mixing. Thus, an improper wavelength arrangement is currently almost impossible to detect, highlighting the utility of the disclosed receiver.

In addition to indicating the possible presence of 4 WM, significant noise at higher frequencies might also be the result of a defective transmitter or fiber defects due to differing types of fiber installed in the network. The disclosed receiver, however, is capable of distinguishing among these causes of noise in high frequencies. Specifically, when CSO causes noise at a receiver, then generally the noise should be much lower after the distortion cancellation circuits 122 and 124 than before the distortion cancellation circuits 122 and 124. Because the spectrum can be analyzed before and after the distortion cancellation circuits 122 and 124, the disclosed receiver may thus differentiate between distortion induced noise (such as fiber distortion or alternatively filter-induced distortion) and random noise where abnormal high frequency random noise can generally be ascribed to 4 WM. (As discussed in the previous section, abnormal low frequency noise without corresponding high frequency noise can generally be ascribed to SBS.)

Many operators use significant amount of fiber in their system, but the operators typically do not know the fiber types or lengths. Even when they do, operators typically do not have accurate values for the fiber types or fiber lengths. Thus, frequently the operator is unaware of the system's capabilities, and while the operator may record an estimated or assumed fiber type and length, the likelihood is that these parameters are inaccurate, meaning that the transmitter is configured based on faulty assumptions or estimates of the fiber type/links. The transmitter is configured to determine how much CSO distortion the transmitter must cancel based on these faulty estimates. Thus, frequently the transmitter does not adequately cancel CSO distortions.

Using the disclosed receiver, however, fiber information can be provided to the head end and operator by reading out the fiber distortion cancellation circuitry setting for minimum distortion, as described below, and by reading the detector current using the non-invasive methods previously described, which do not require a manual measure of the fiber laid in the ground.

In some embodiments, system monitoring achievable using the disclosed techniques include: (1) analyzing high frequency spectrum before and/or after the distortion cancelling circuits 122 and 124; and (2) analyzing the settings of the distortion cancelling circuits 122 and 124. The presence of noise above a threshold frequency band indicates the presence of 4 WM in system, which is an important troubleshooting result. The presence of a large amount of CSO distortion compensation indicates presence of bad filter or drifted wavelength. The presence of a large amount of fiber CSO distortion compensation vector indicates severe transmitter chirp. The presence of unexpected fiber CSO distortion compensation vector indicates that a different fiber type is present.

The distortion cancelling circuits 122 and 124 reduce fiber dispersion and filter dispersion. The spectrum analyzer 128 can be used to analyze the circuit prior to distortion cancelling circuits 122 and 124, as well as after distortion cancelling circuits 122 and 124. However, before the distortion cancellation circuits, there is uncertainty regarding the source of the noise, e.g., whether the problem is due to bad passives, forward mixing, SBS, etc. After the control loops, it is easier to conclude the source of the problem based on the frequency level. Thus, the distortion cancelling circuits 122 and 124 assist the operator to monitor the system over time.

Because the distortion cancelling circuits 122 and 124 are present, they can inform the microprocessor and control 120 how they are configured, and can report the performance of the filters in the system, the amount of fiber in the system, the status of the transmitter, and what fiber is functioning. Thus, instead of performing complex measurements and calculations in the field, measurements can be identified at the receiver.

Wavelength drift is also often present. If the frequency distortion vector is at unacceptable levels, as described herein, or if distortion for the optical path is very high in the receiver, the receiver is actively attempting to cancel the distortion. Determining what the source of that distortion (e.g. high chirp, high wavelength drift, etc.) is difficult using existing techniques. For example, with wavelength drift the output of the optical filter may significantly impact the generated CSO, the optical power, and forward mixing, because wavelengths are moving expected boundaries. In a multi-wavelength system, many unknown effects are occurring. As multi-wavelength systems become more popular), access to information within the system such as the measurements described herein are desirable for troubleshooting the system, reporting information back to the head end, etc.

Some embodiments if the disclosed receiver may perform the following functions: (1) analysis of Node output spectrum; (2) monitoring of amplifier health and amplification level; (3) detection of a faulty node amplifier; and (4) detection of node configuration error using the RF level at the receiver output and the comparison of a calculated Node tilt to the Node output, whereby a difference is flagged and reported.

Specifically, the disclosed system may monitor the output of a node amplifier to identify the distortions of the outputs from the amplifier. Further, the system can determine the node configuration. Often, components are configured incorrectly in the field, requiring later repair. The disclosed system monitoring techniques assist in identifying the source of the error. The need for such monitoring may be more critical in 1.2 Ghz systems. For example, an MSO may dictate a certain amount of tilt and a particular dBM level, but there is no method for confirming these values. The optical input includes a tilt functionality to determine how it should look at a particular tilt and gain, and then sample the node output also. If the two values match, then the node configuration has been set correctly, and the levels are outputting properly. If the values do not match, then the node was set incorrectly. Thus, the disclosed system assists in determining if the node configuration is proper, which at high levels is very useful.

The benefits of system monitoring that may be achieved via the disclosed techniques may include automatically recovering system levels and performance if redundant path switchover is performed and reporting back via EMS 172. Many CATV networks include redundant paths. However, when switching to a redundant path, the amount of fiber distortion changes—sometimes dramatically. To address the distortion of the redundant path, linearizers move to another position, spectrum measurements may change, and new values may be reported to the to the head end, thereby identifying the distortion as it exists for the redundant path. The head end can use the information to adjust the signal to the receiver by instructing the node to do certain things, e.g., changing the receiver setup. This could become more common, such as when later versions of DOCSIS are implemented (e.g., DOCSIS 3.1 requires different signal levels of the channels coming out of the node then DOCSIS 3.0). The head end can instruct the node to adjust settings as needed for the load being provided, and the system can then report its performance back to the head end. As more information is included in the system, it is useful to have a safety margin built in, enabling the node to react autonomously and maintain a healthy state.

The benefits of system monitoring that may be achieved via the disclosed techniques include: (1) reporting status information to the head end via EMS system; (2) head end monitoring of node and receiver status; (3) allowing a head end to instruct changes to receivers and nodes, and verify node performance with any modified configuration; (4) reporting to the head end results from the entire spectrum (e.g. BC, NC, Both, Rx Out, Node Out) which is important for trouble shooting and system proofing). With respect to this latter function, the receiver can be sampled at various locations, as previously disclosed. For example, five locations described herein are at the broadcast input, at the narrowcast input, the BC/NC combined signal, the output of the complete receiver (the receiver itself has a finite amount of tilt, which can be varied), and the node output. At each location, the expected value can be compared to the actual value; since the input optical value is known, an expected RF value may be determined for each stage, thus permitting a comparison to the actual value. In some embodiments, a table may identify the measurements.

The disclosed techniques for system monitoring may be used with a receiver having a single photodiode. The disclosed techniques may also be used for a receiver that includes more than one photodiode, such as the dual receivers shown in FIGS. 1-3. Those of ordinary skill in the art will appreciate that the disclosed receiver is not limited to a certain number of photodiodes. Examples described herein are applicable to single photodiode receivers, dual receivers, or receivers with more than two photodiodes. For purposes of simplicity, examples are discussed with respect to a single photodiode receiver as that is the type most currently used today. However, as described above, broadcast/narrowcast overlay networks are being introduced and may also benefit from the disclosed techniques.

Further described below are embodiments for using the disclosed circuitry to achieve distortion minimization, including configuring the disclosed circuit design for: (1) dynamic fiber dispersion cancellation in HFC networks; (2) dynamic optical filter distortions cancellation in HFC networks; (3) dynamic per channel RF power management in HFC networks; and (4) novel dynamic BC/NC overlay setup and management in HFC networks.

Dynamic Fiber Dispersion Distortion Cancellation

Transmitters commonly available today provide dispersion cancellation at the transmitter. However, no current solution exists that dynamically cancels fiber link distortions. Existing pre-distortion techniques require a priori knowledge of link characteristics to implement any link distortions. For example, a directly modulated transmitter implementation may have limitations when used with mixed analog and QAM links, full spectrum applications, redundant links, unknown length links and in use with regular optical filters. When configured, the transmitter is initially configured to cancel dispersions on a fixed optical link, e.g., 45 km optical link length. However, because the actual optical link length varies, and because mistakes are often made when measuring and manually entering the optical link length, the transmitter is often not configured properly for the actual length of optical link.

Disclosed herein is a novel receiver that corrects the dispersion component. Referring again to FIGS. 3A and 3B, a microprocessor algorithm in microprocessor 120 outputs a Control Voltage in two independent loops—one for dispersion fiber CSO control 124 and one for optical passive Filter CSO control 122. The operation of each loop with its associated algorithm is essentially identical. Accordingly, although the operation of the fiber dispersion CSO Loop 124 is discussed by way of example, those of ordinary skill in the art will recognize that the disclosure also applies to the optical passive Filter CSO control 122.

Figure 4A:
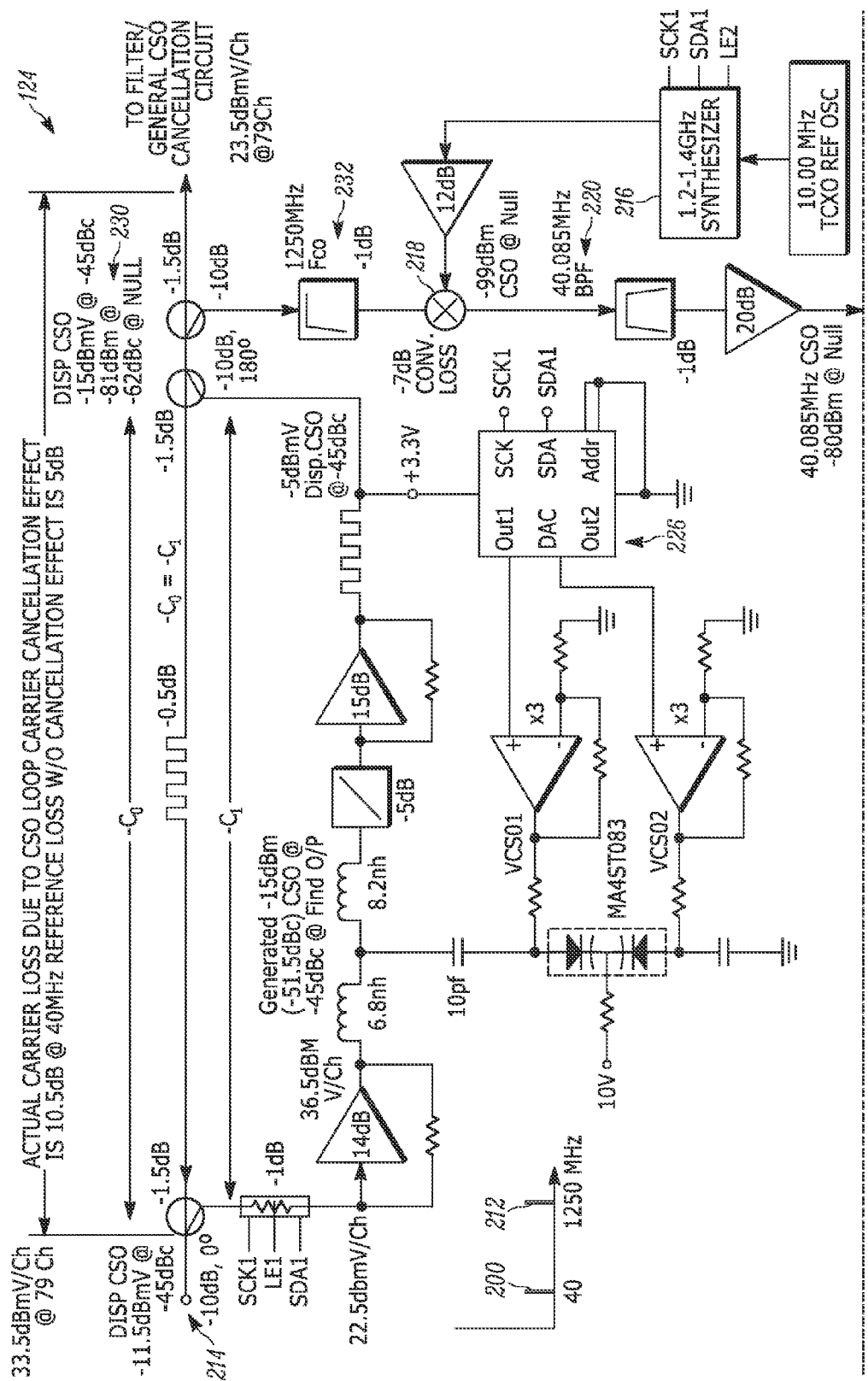
FIGS. 4A and 4B show a first portion and a second portion, respectively, of a block diagram for dynamic dispersion compensation for the exemplary receiver of FIGS. 3A and 3B.
Figure 4B:
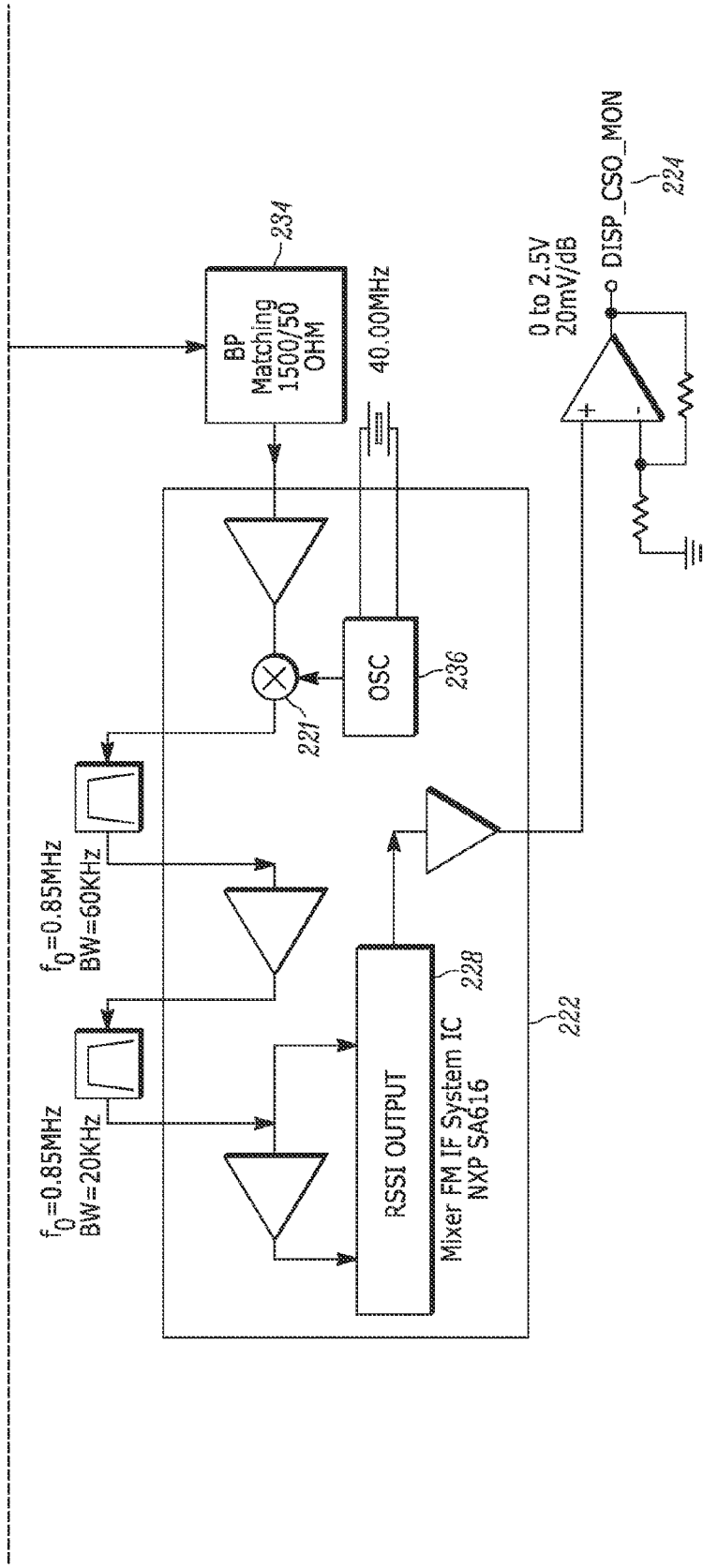

FIGS. 4A and 4B show a first portion and a second portion, respectively, of an exemplary fiber distortion cancellation circuit 124, which as just noted may also be illustrative of a passive distortion cancellation circuit 122. As shown in FIGS. 4A and 4B, two tones 210 and 212, typically 40 MHz and 1250 MHz, are applied at an input 214 to the cancellation circuitry 124 and will produce two low level system generated CSO distortion components, one at 1290 MHz and the other at 1210 MHz. The fiber distortion cancellation circuit 124 must first monitor and establish the magnitude of any one of these distortion levels in order to minimize it. The process of monitoring is accomplished by a standard super-heterodyne technique whereby a high frequency signal (1290 MHz in this case) is converted (mixed down) to a much lower frequency to enhance the received sensitivity. This conversion process is accomplished by the 1.2-1.4 GHz Synthesizer 216 which is the conversion process Local Oscillator. The Local Oscillator 216 and Mixer 218 first convert the 1290 MHz CSO component to 40.085 MHz using a bandpass filter 220. The 40.085 MHz signal is further converted to 0.085 MHz and fed to a narrow bandwidth filter by the mixer 221, which after processing by the Mixer FM IF System IC will output a DC level 224 that is proportional to the magnitude of the CSO distortion product at its input. The DC level is fed into the Microprocessor 120.

At the beginning of the optimization routine the Microprocessor will output an initial voltage to the CSO Control Loop via the output ports (Out1 and Out2) of the digital analog converter (DAC) 226. These voltages are preset values that are seed values that presuppose what the optimum setting should be. Due to link temperature and component dynamic performance changes they will not normally be the final values that are established by the fiber distortion cancellation circuit 124.

Figure 5:
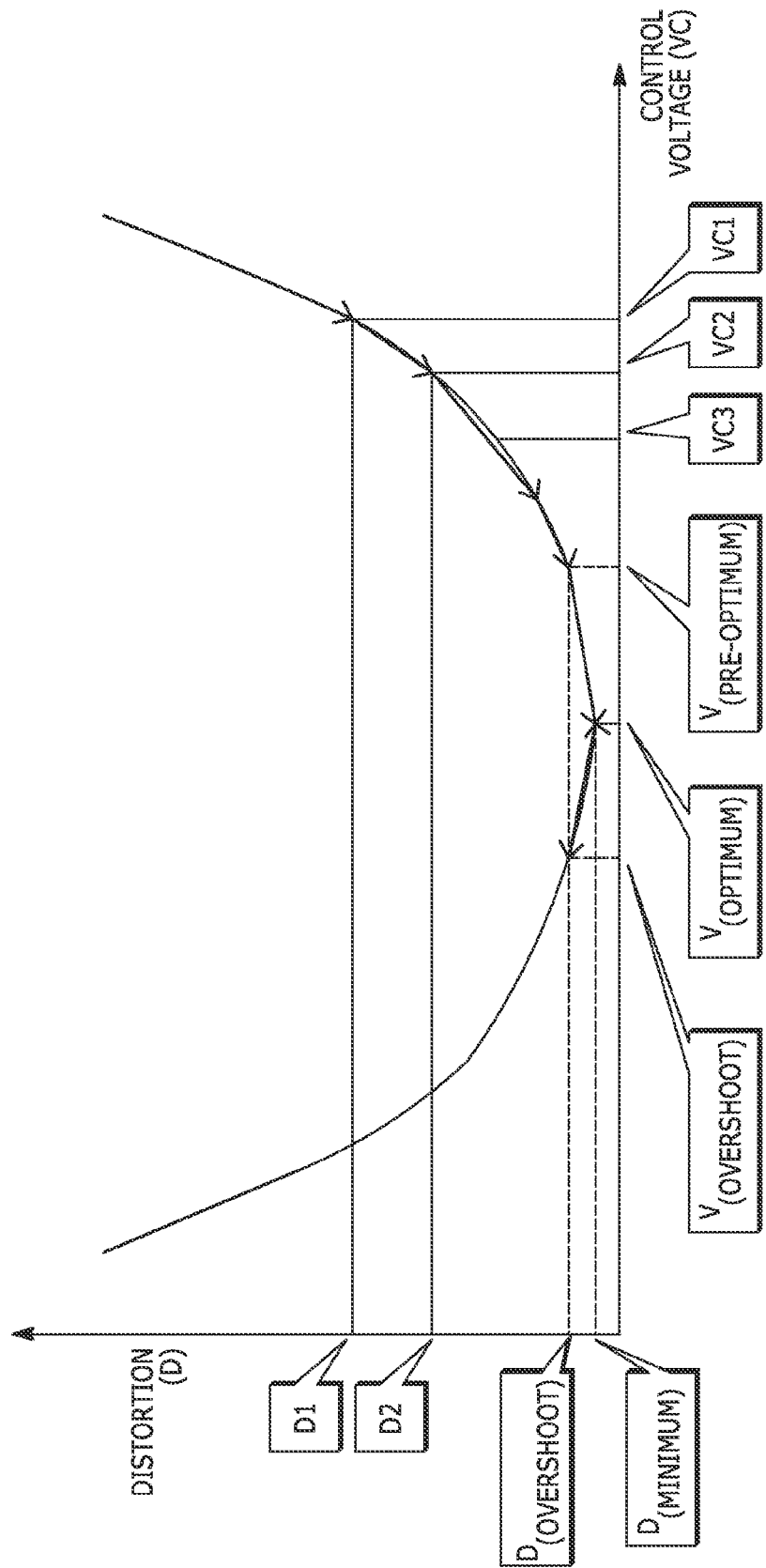
FIG. 5 shows distortion as a function of control voltage for the exemplary receiver of FIGS. 3A and 3B.

FIG. 5 is an illustration of an embodiment of a process for adjusting the control voltage of CSO generation logic. Using the algorithm depicted, the voltage may be toggled until the optimum CSO distortion is determined. An initial control voltage is provided to the distortion cancellation circuit 124. This initial voltage V1 is a preset (seed) value that presupposes an optimum setting. Due to temperature and component aging, the preset voltage V1 is typically not the final value that is established. At this setting, the distortion detection logic feeds back a distortion value D1 to the control logic.

Assume that one of the starting voltages is VC1 in FIG. 5. At this setting the fiber distortion cancellation circuit 124 will feed back at its output 224 a distortion value D1 to the Microprocessor 120. Because this is a single value, the processor has no way of knowing if it is optimum or not. For this reason, the processor output another voltage VC2 that is higher or lower than VC1 during the first step, and monitors the corresponding distortion voltage D2.

The processor 120 will then monitor the corresponding Distortion voltage D2. In this case assume that the voltage VC2 is lower than VC1 and that distortion voltage D2 is lower than D1. Because D2 is lower than D1 for a lower control voltage, the processor 120 knows that lowering the control voltage was the correct direction to take. Had the distortion been higher for a lower control voltage the processor 120 would have made the next control voltage VC3 higher than VC1. In this case the direction of control voltage change was correct and the processor 120 will output the third control voltage VC3 as a value lower than that of VC2.

This iterative process will continue until the control voltage becomes V (optimum) for a corresponding distortion value D (Minimum). At this point the processor has no way of knowing if this is the optimum setting or not. For this reason it will output control voltage V (Overshoot) for a distortion value D (Overshoot). D (Overshoot) is higher than the optimum value that was previously monitored. Since the current Distortion is higher than the previous distortion the processor knows that it went too far with the control voltage change and it will return to the previous value V (Optimum). The processor 120 will continuously output control voltages on either side of V (Optimum) and follow the above process so that the fiber distortion cancellation circuit 124 will always be operating at the valley (optimum point) of the Distortion vs. Control Voltage characteristic. As illustrated by FIG. 5, an optimum voltage level may be determined by toggling the voltage until the level settles at the bottom of a parabolic curve representing the distortion level.

FIG. 5 depicts an embodiment of the circuitry to implement the disclosed dynamic dispersion cancellation using a two tone approach with the disclosed receiver circuitry, enabling dynamic filter distortion cancellation.

With dynamic dispersion, the chirp of the laser interacts with fiber and produces second order distortions. These increase with frequency and fiber length according to a predictable formula. What is unknown is the fiber length. Thus, if a second order beat due to the optical fiber is generated, the cancellation of the second order beat in the profile of the formula also cancels distortions across the frequency spectrum. Thus, by having two tones in the transmitter, the distortion received at the receiver above 1.2 GHz is cancelled.

FIGS. 4A and 4B depict varying embodiments of the disclosed dynamic dispersion cancellation techniques. In embodiments, stepping of a synthesizer 216 is used to find a peak of the passband to find the maximum beat tone detection sensitivity. In some embodiments, a phase lock loop is used to determine a maximum beat tone detection sensitivity. Some embodiments of the disclosed techniques for dynamic dispersion cancellation may include a transmitter that is dispersion-compensated for a standard nominal link and outputs two tones, e.g. a first tone above 1.2 GHz and a second tone below 50 MHz. Fiber dispersion generates CSO distortion, which will be at a maximum above 1.2 GHz. Since the beat level is quite low, the disclosed receiver uses a synthesizer having a novel sweep and search algorithm to mitigate the frequency drift of the high frequency tone, and identifies the beat magnitude. This search routine allows for the use of a narrow detection bandwidth which enhances the CSO beat tone detection sensitivity.

Another method is to phase lock the detection receiver local oscillator to the higher frequency of the two out of band transmitted tones, which negates the effect of the tones frequency drift. This also facilitates the use of a narrow detection bandwidth for maximum sensitivity. The receiver then uses a linearizer and dynamically minimizes the tone. The result will be minimized distortions across the RF band The loop is continuous. If there is an abrupt change in the distortion content, it signals a changeover from the primary to secondary link and the loop resets to cancel out for the new condition.

The Receiver notes the Transmitter Linearization Length (TxL), and generates its own Receiver Linearization Length (RxL). It then transmits the RxL information to the head end. The transmitter at the head end can then adjust its TxL as TxL+RxL, thereby cancelling further the distortions. The receiver can then reset its RxL and further reduce distortion.

Alternatively, the Receiver may simply provide the RxL to the transmitter, which uses it to optimize the TxL. In this instance, the receiver may not provide any linearization, but is providing feedback to the Transmitter. If the RxL+TxL is significantly greater or lesser than what the MSO would consider appropriate, an error message may generated alert to either a link length problem or a fiber type problem.

As illustrated by FIGS. 4A and 4B, dispersion cancellation may be based on two tones, one below 45 MHz, and one above 1220 MHz. As the tones propagate through the system, traveling through the fiber, distortion is generated. At a summation point, a distortion component is generated, e.g., 1290 MHz, which is proportional to the amount of distortion generated. Thus, when the distortion component, e.g., the 1290 MHz component, is generated it can be minimized by the processor 120. FIG. 5 illustrates a manner for minimizing the distortion, which is more effective if the actual value of distortion is known.

As shown in FIGS. 4A and 4B, the total band input is sampled at the coupler 230. Below the coupled point is a filter 232 to pass all frequencies above 1250 MHz. The sampled input is filtered to avoid overloading the system or overloading channels below. Because the system has a high payload, with a lot of gain in the receiver, the input would be subject to overload if not filtered. The output of a filter is input to the mixer 218.

In some embodiments, since the beat level is quite low and cannot easily be found in the background of other signals without using narrow bandwidth detector, the disclosed receiver uses a synthesizer having a novel sweep and search algorithm that mitigate the frequency drift of the high frequency tone, looks for the actual beat frequency, and retrieves the beat magnitude. This technique allows for the use of a narrow detection bandwidth, which enhances the CSO beat tone detection sensitivity as needed.

The synthesizer 216 mixes the 1290 MHz signal and reduces the beat signal frequency down to a first intermediate frequency (IF), e.g., shown as a 40.085 MHz. Then, the 40.085 MHz signal is amplified before feeding it to a bandpass matching component 234, then to an FM receiver 222, i.e., narrowband receiver that has 0-2 MHz IF. In this example, the frequency used is 0.085 MHz IF frequency. Thus, the 40.085 MHz signal is mixed down again to 0.085 MHz to get more gain with a very narrow bandwidth. The front end, therefore, has a 40 MHz oscillator 236, mixed with the 40.085, and resulting in a very low frequency component that represents the distortion coming in.

All of this conversion takes place because sensitivity is important, with a very narrow bandwidth. Narrow bandwidth is not possible with a very high IF. The process of reducing the frequency allows for a very narrow bandwidth with a high level of sensitivity. The novel sweep and search algorithm used by the synthesizer is used to ensure that the precise frequency needed for the narrowband detection process can be found.

The FM receiver 222 is preferably an integrated circuit with a built in RSSI output 228, which is an output that is proportional to the distortion. The RSSI output 228 is fed back to the microprocessor 120, which senses the signal and determines whether to increment or decrement the control voltage (e.g., see FIG. 5), which increments or decrements the amount of correction included.

It should be understood that, following the first mixer 218 is a 40 MHz bandpass filter 220, which is also narrow. In order to get the signal to reduce and flow within the passband of the FM IF integrated circuit 222 shown in FIGS. 4A and 4B, the signal may drift outside a detection bandwidth. Drifts of 40 ppm (parts per million frequency) or more could be significant. Thus, in this example, a 1.29 GHz CSO distortion signal would drift too much, and the signal could drift outside the detection bandwidth of the circuit. To circumvent wavelength drift, the output of the receiver is monitored and the synthesizer is walked through integral steps to identify a peak. Once establishes that a peak has been reached, the center of the detection band is identified. The peak value is reached, and the value can be maintained to hold that capability and used to minimize distortion.

In another embodiment, the detection receiver local oscillator is phase locked to the high frequency tone which negates the effect of the tones frequency drift. This also facilitates the use of a narrow detection bandwidth for maximum sensitivity. The phase locked loop can handle the more significant signal, e.g., the 1290 MHz signal, by locking a local oscillator to the 1250 MHz pilot tone, and then using that output to drive the mixer 218. In this example, the predominant drift is the higher frequency pilot tone at 1.25 GHz which combines with the 40 MHz pilot tone to crate the 1290 MHz distortion signal. A typical amount of drift at 40 pp/million affects 1.25 GHz more than 40 MHz in an absolute sense. Locking the PLL on to the 1250 MHz signal would enable tracking the signal to minimize the drift, which can be mixed down as described above. If the 1250 MHz signal is locked on with PLL, there is less concern regarding drift.

The manner for cancelling dispersion described here at a receiver is not currently known, nor is a high sensitivity receiver for detecting the dispersion component (which is much lower than normal), Thus, a signal at −90 dBM is a low signal that will require a lot of sensitivity to detect. The mechanisms described herein by using the synthesizer or the PLL enables the high sensitivity. The superheterodyne receiver combined with a synthesizer sweep or the PLL for controlling dispersion is thus disclosed.

As described in more detail herein, the fiber lengths and types are often incorrectly manually set up. The disclosed smart receiver can adjust based on the actual dispersion components based on the actual results of the fiber type/length.

Figure 6:
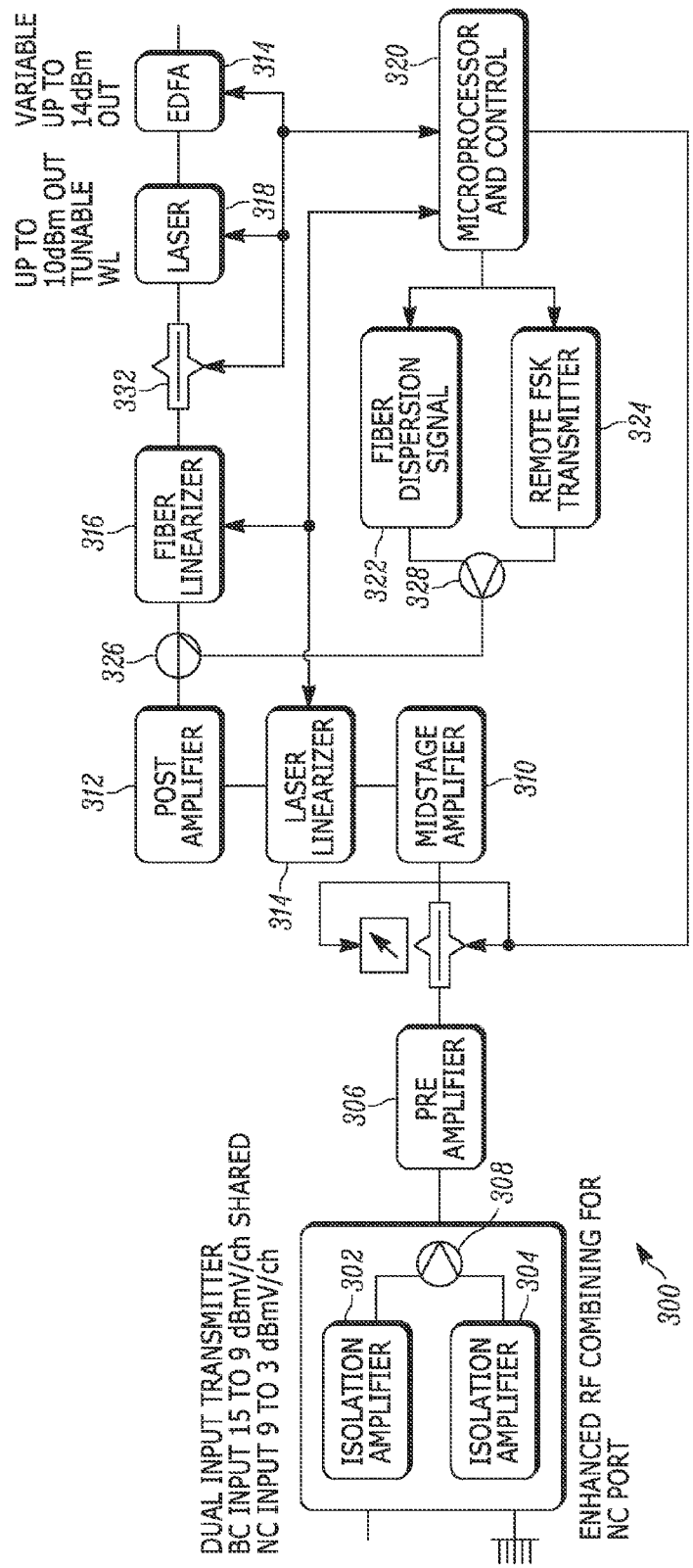
FIG. 6 shows an exemplary transmitter capable of transmitting an optical signal that can be processed by the receiver of FIGS. 3A and 3B.

The disclosed dispersion cancellation techniques can occur in the transmitter, receiver, or in both places. FIG. 6 depicts a transmitter, which can alternately function as any one or more of: (1) a fixed wavelength transmitter; (2) a high power, variable output, tunable wavelength transmitter; (3) a low RF input, fiber dispersion signal, remote com transmitter with a passive narrowcast combiner. The transmitter shown in FIG. 6 may include any of the functionality of the receivers previously disclosed.

The transmitter of FIG. 6 may preferably be configured as a dual input transmitter that includes plural isolation amplifiers 302 and 304, each outputting a respective signal combined by a coupler 308 and then amplified by a preamplifier 306. The output of the preamplifier 306 may preferably be attenuated by a variable attenuator 330, then amplified by a midstage amplifier 310 and a post amplifier 312 prior to being attenuated by a variable attenuator 332, the output of which drives a tunable wavelength laser 318. In some embodiments, the optical output of the laser 318 is amplified by an erbium-doped fiber amplifier (EDFA) 319.

Preferably, a laser linearizer 314 and fiber linearizer 316 are respectively positioned to either side of the post amplifier 312, each preferably variably controlled by a microprocessor and control unit 320. In some embodiments, the transmitter 300 may include a fiber dispersion signal module 322 and Remote FSK transmitter 324 together outputting a signal via coupler 328, and controlled by the microprocessor and control 320, that variably controls the fiber linearizer 316. A coupler 326 feeds both output of the post amplifier 312 and the fiber dispersion control signal to the fiber linearizer 316. The microprocessor and control 320 also variably controls each of the attenuators 330 and 332, as well as the laser 318 and the EDFA 319.

It should be understood that a type of linearizer is not specifically targeted at any of these distortion components, e.g. fiber distortion, laser distortion, or filter distortion. For example, "full quadrant linearizers" integrated in transmitters can generate most realistic vectors that are described by a complex analytical function. The analysis can be done to show that fiber and filter distortions as well as residual laser distortion are of concern.

While not targeting any distortion specifically, settings must be calculated for CSO distortion, e.g. distortion composed of multiple distortion-generating components. For certain transmitters that do not require a separate linearizer for each purpose, but instead use a small compact structure the control and alignment software, such calculations are not trivial.

Figure 9:
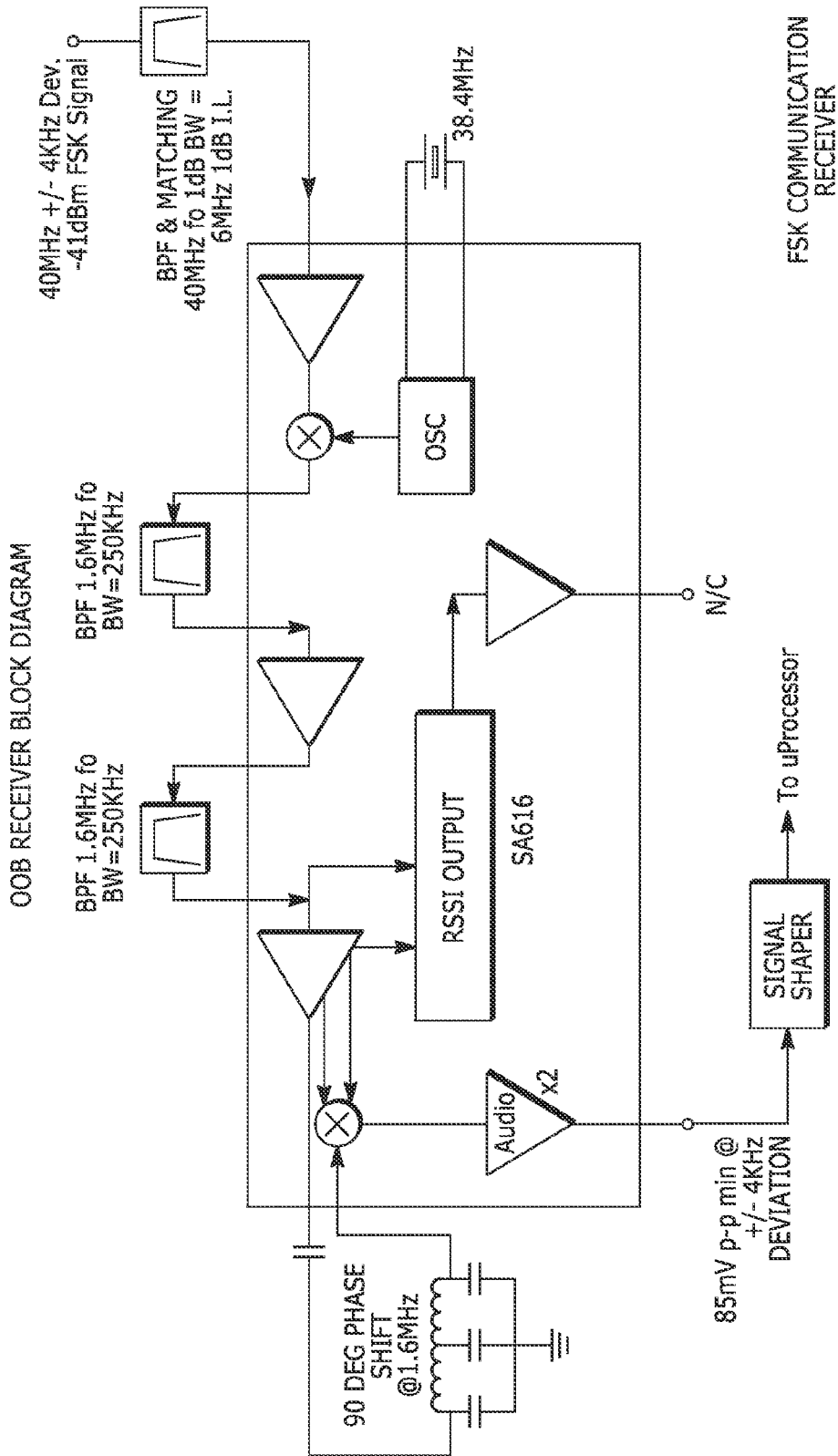
FIG. 9 shows exemplary circuitry for an out-of-band (OOB) receiver.

For the receiver to cancel the fiber dispersion, the receiver needs an out of band signal OOB channel. As described in more detail below, FIG. 9 illustrates example circuitry for an OOB receiver and illustrates sample features of a transmitter and the node based on OOB communications protocol.

Dynamic Optical Passives Distortion Cancellation

Disclosed herein is circuitry for a dynamic nature of distortion compensation for passive CSO distortion, which change with temperature and length of the fiber link, which is different from one link to another, and which can switch from primary to redundant while in operation. In some embodiments, the dynamic optical passive distortion cancellation may be used with the RF signal and pilot tones disclosed herein.

Disclosed are dynamic optical passive distortion cancellation techniques. With optical passive distortion, the chirp of the laser interacts with optical passives, primarily producing second order distortions. The second order distortions change with a changing Insertion Loss (IL) profile of the passives. Therefore, at the receiver second order distortions below 55 MHz may be examined, which will appear as noise aggregation at this frequency for QAM modulated RF Carriers. Also at this frequency, the analog channels will generate discrete beats for AM modulated RF Carriers. Through a combination of techniques, these distortions can be canceled with the design of linearization in transmitters, which improves the SNR across the frequency spectrum since the optical passives-induced distortions are generally flat across the spectrum.

In some disclosed embodiments of a dynamic optical passives distortion cancellation system, a transmitter is provided with an RF signal to propagate along a fiber. Optical passives will generate distortions across the whole RF band and at multiples of 6 or 8 MHz at the low end of the spectrum. The disclosed receiver may detect and determine the "beat" magnitude of the received signal. The receiver then uses a linearizer and dynamically minimizes that "beat" which will result in minimized distortions across the RF band. The disclosed receiver may preferably continuously monitor and reduce the "beats" because the optical performance of the optical passives continuously changes with temperature. The disclosed receiver may preferably determine the transmitter's chirp (TxC) and Transmitter Linearization for Passives (TxP) if available, then generate its own Receiver Linearization for Passives (RxP). The receiver then transmits the RxP information to the head end. The transmitter at the head end can then adjust its TxP, thereby cancelling further the distortions. Now the disclosed receiver can reset its RxP and further reduce the distortions.

Alternatively, the Receiver may simply provide the RxP to the transmitter and the Transmitter may use it to optimize the TxP. In this case, the Receiver is not linearizing but simply providing feedback.

If the RxP differs significantly from what would be anticipated, the disclosed receiver may generate an appropriate ERROR message alerting to a wrong passives problem or to a laser wavelength drift problem.

Figure 7A:
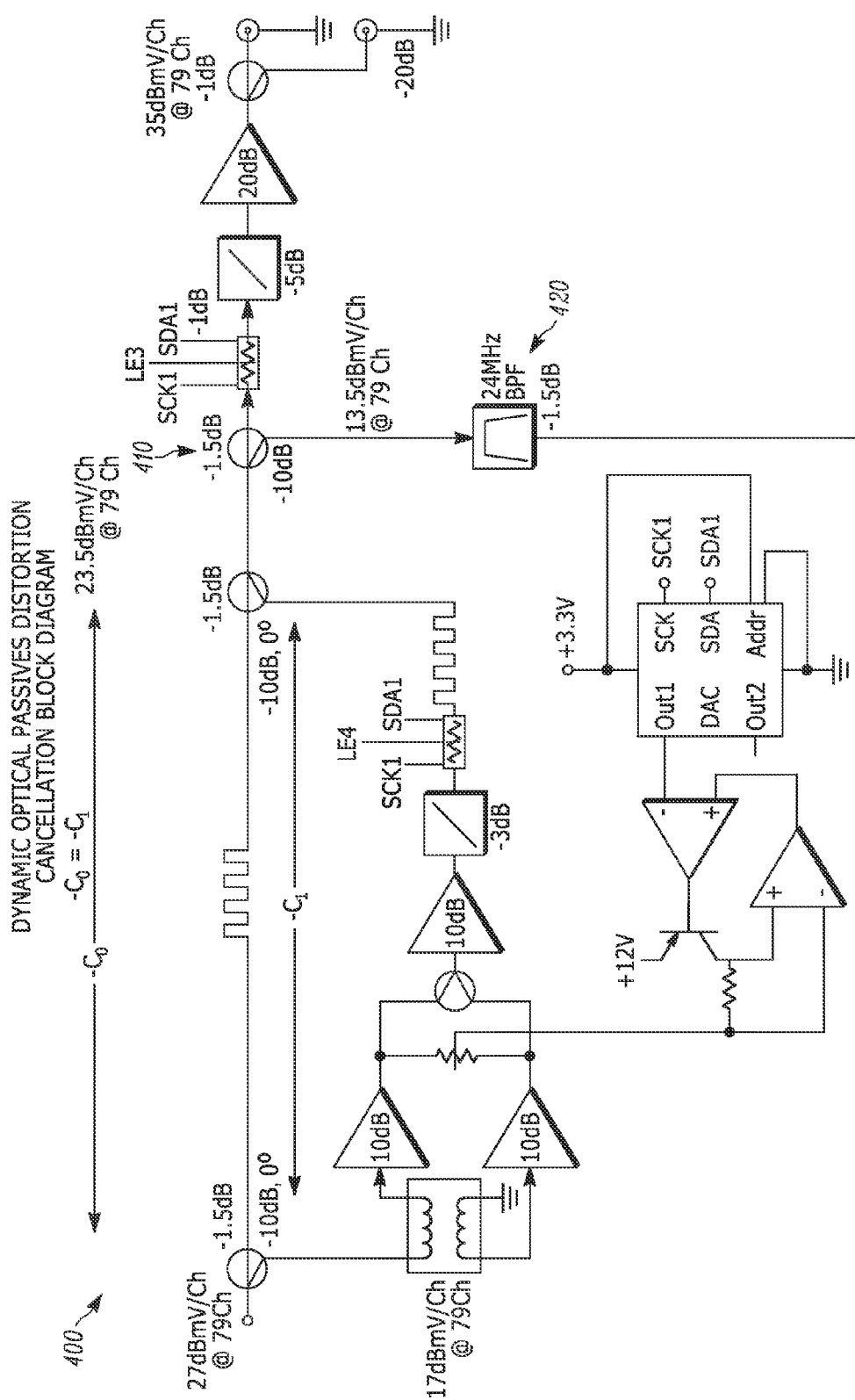
FIGS. 7A and 7B show a first portion and a second portion, respectively a block diagram of circuitry for dynamic distortion cancellation.
Figure 7B:
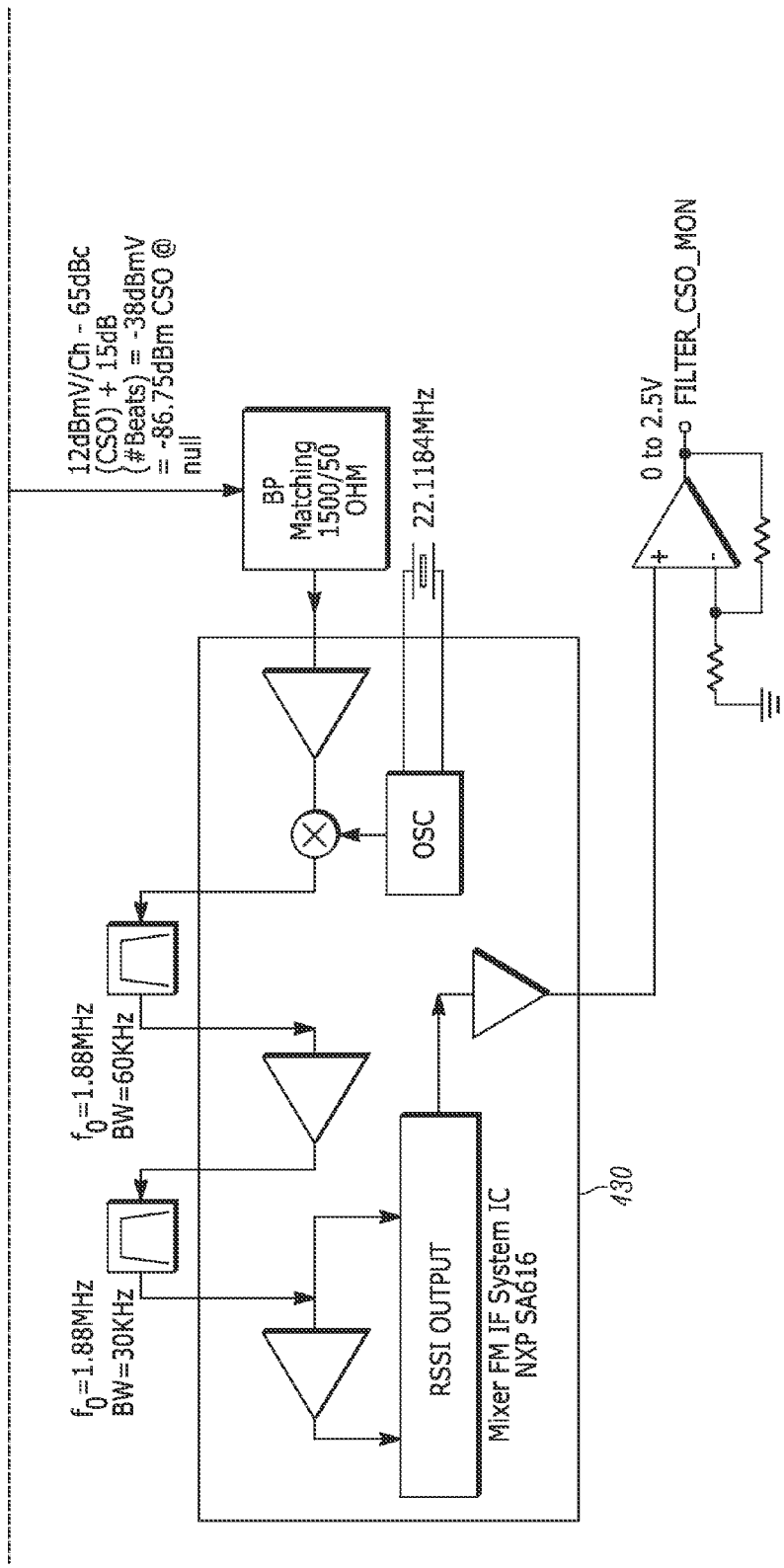

FIGS. 7A and 7B show a first portion and a second portion, respectively a block diagram of circuitry for dynamic distortion cancellation FIGS. 7A and 7B show a first portion and a second portion, respectively, of an embodiment of circuitry that implements the disclosed dynamic optical passives distortion cancellation techniques, where normal distortion components are detectable. The circuitry may be similar to the monitoring circuitry shown in FIGS. 4A and 4B however less sensitivity may be required for normal dispersion detection, therefore pilot tones may not be used in some embodiments.

As shown in FIGS. 7A and 7B, a feedback signal is generated, which has a distortion that is out of phase with an input signal, thus providing cancellation of distortion. In the upper path shown in FIGS. 7A and 7B, a signal is input to a coupler 410. The output is sampled, and then input to a 24 MHz bandpass filter 420. The receiver chip is similar to that shown in FIGS. 4A and 4B, but with a different IF frequency, and is similar in principle to the functions shown in FIGS.

4A and 4B. The magnitude of the component is sent back to the microprocessor 120. The microprocessor 120 has a seed value applied to the generator. Based on stepping of the control voltage up or down, the microprocessor 120 determines whether to increment or decrement. Thus, no conversion is required except in the IF chip.

In contrast to FIGS. 4A and 4B, which depicted dual conversion mixers, FIGS. 7A and 7B depict a single mixer 430. No external tone is needed from the transmitter; the cancellation techniques function is based on the signal itself, i.e. a signal that conveys the content to be delivered to a customer of an HFC CATV provider as opposed to a "tone." Thus, if no signal is sent, then there is no cancellation. If a very few signals are sent, the chirp of the laser may be small and no more than minimal cancellation may be necessary. The amount of cancellation is proportional to the magnitude of the CSO distortion content within the incoming signal. Thus, the 24 MHz CSO component described earlier is used as the cancellation mechanism. As opposed to the dispersion case, a formula indicates the necessary amount of cancellation, based on the length of the fiber, the Laser chirp factor, and the particular lower and upper tone frequencies.

FIGS. 7A and 7B depict a block diagram for dynamic optical passives distortion cancellation configured for use with any transmitter. For example, if tones are not included or available by the transmitter in a particular system, the disclosed receiver can still provide significant benefit for distortion cancellation. With the 24 MHz selection described above, separate mixers are not necessary, as they are with respect to the system depicted in FIGS. 4A and 4B, for example. Prior techniques using any type of post-distortion components in the receiver do not include the disclosed distortion detection and feedback control loop.

Dynamic RF Level Stabilization

Embodiments for dynamic RF level stabilization are disclosed. For the foreseeable future, HFC networks will operate with multiple types of RF signals, which might include Analog, D3.0 QAM256, Video QAM256 and D3.1 QAM1024/4096/16384 among others. Each of these signals all have differing SNR requirements and associated throughputs. As the RF plant undergoes a transformation with varying intermixing of these signals, it is essential to maintain the option of varying the RF input levels to the transmitter that supplies signals to the HFC plant. Assigning the RF input can be accomplished either within the AGC mode or the MGC mode of the transmitter. If simple rules of relative RF level differentials for the various signals are established, the AGC mode of a transmitter is simple to operate and enables the use of the optimum OMI of the transmitter, supplying an appropriate OMI to the appropriate signal. Being in the MGC mode, while recommended, is rarely followed in the field, sometimes due to the misplaced worry that it compromises performance. However, using the AGC mode causes changes in the optical nodes that could have disproportionate detrimental effects on the node and on the subsequent RF amplifier chain due to the effect of Tilt in optical Nodes. In existing HFC systems, there is no effective way to control for the RF levels in the node to maintain a per-channel AGC, because it is not possible to transform the RF levels that are flat when output from the transmitter to the tilted levels output from the node. Maintaining a per-channel level out of the Node is essential in modern HFC networks so as to ensure that the subsequent components behave appropriately and a predetermined RF level is available at the CPE.

Due to the tilt at a fiber node, it is insufficient to simply be aware of the total RF level at the receiver in order to effectively determine the RF level after tilt. Therefore, the present system discloses a tuner that continuously scans the RF spectrum and measures the RF level in chunks of bandwidth, e.g. of approximately 22 MHz. This will produce a clear estimate of the levels across the RF spectrum. If the RF levels per channel are now matched across the spectrum, either while the spectrum is flat or while a tilt is calculated, the same RF power per channel can be maintained regardless of changes to RF level at the transmitter. With a communication from the transmitter to the receiver, alternatively, the RF levels may be increased or decreased. The communication protocol may also indicate wavelength movement needs for the reverse transmitter if employed in the RFoG mode to mitigate Optical Beat Interference (OBI).

Furthermore, all optical links presently suffer from the inability to correctly hold the power per channel level at the node due to the effect of node tilt. Disclosed, however, is an inexpensive RF tuner-based sensor that mathematically simulated and sets tilt. Preferably, this is achieved by enabling per-channel RF power level stabilization in the receiver.

In some embodiments, the disclosed circuitry implements an auto set. Knowing the modulation depths of the RF levels, and their associated optical properties, the RF levels can be set to very precise values, which until now was not possible because the modulation depth of each channel was not available. Features of dynamic RF level stabilization techniques preferably include: (1) basic RF Level stabilization; (2) dynamic BC/NC overlay; (3) a system health indicator; (4) an OOB Communications Protocol for the transmitter and the node; (5) dynamic OBI Mitigation for RFoG; and (5) Variable Laser Output Power.

Basic RF Level Stabilization

Initially the Optical AGC is obtained to set the before-and-after RF levels. It should be understood that these levels are those of the transmitter showing at the Receiver. The RF SA function will scan the spectrum from 50 to 1.2 GHz and note the RF level in 22 MHz spectrum increments. It should be understood that these RF levels are without tilt.

MANUAL SET NODE: If the Set Node command is sent and the OLD GAIN/TILT settings and the NEW GAIN/TILT settings are sent, the receiver adjusts the RF levels to the new settings within the limits of the receiver. If a newer setting is needed, then a new command is resent with the new tilt and Gain setting. Preferably, the receiver will not be in the automatic mode, but will only follow the command sent.

AUTOMATIC SET MODE: The system maintains the current Power/Ch., regardless of the changes in the RF levels presented. The system measures and records the RF level across the spectrum. The system applies and records the RF tilt of the link. The system continuously measures and records RF levels at the receiver and calculates the Node RF Tilted levels. If it detects a change in total power and/or per channel power at the receiver, then the system adjusts the RF gain in receiver to match the old per channel power. Preferably, a 50 MHz band is identified that must remain the same before and after a change at the transmitter to enable set and verification of the algorithm.

CUSTOMER AUTO SET MODE: The system maintains the RF Power Levels to what the operator selects. The operator sends to the receiver a configuration of where to hold the RF levels at what frequencies. The receiver gets this information and holds the RF level to that frequency. The operator can send to the receiver the frequencies that need to be held at the current levels and the receiver can hold those frequencies at the current level No Truck Roll Needed In some embodiments, the RF level can be automatically adjusted based upon information received from the receiver. Thus, the RF level would not need to be measured in the field, i.e., tracking of the RF level is not required unless desirable. Because the node output can be controlled, RF level stabilization is possible.

Existing RF tilt stabilization uses tones and pilots, which will not help when the signal levels are periodically switching to different OMI values, as might happen with analog harvesting. Conventional RF amplifier chain AGCs do not include a receiver that takes care of the tilt and also automatically adjusts as needed when operators change the amount of NC content. The disclosed techniques may include pre-combiner measurement of these considerations, or measuring them using the spectrum analysis previously described. When combined with BC/NC level (and or tilt) control, these techniques provide much useful information. For example, one such function can be to monitor total power load under tilted conditions (not just channel levels) to optimally use the amplifier chain today and in future as the NC load is increased.

Figure 8A:
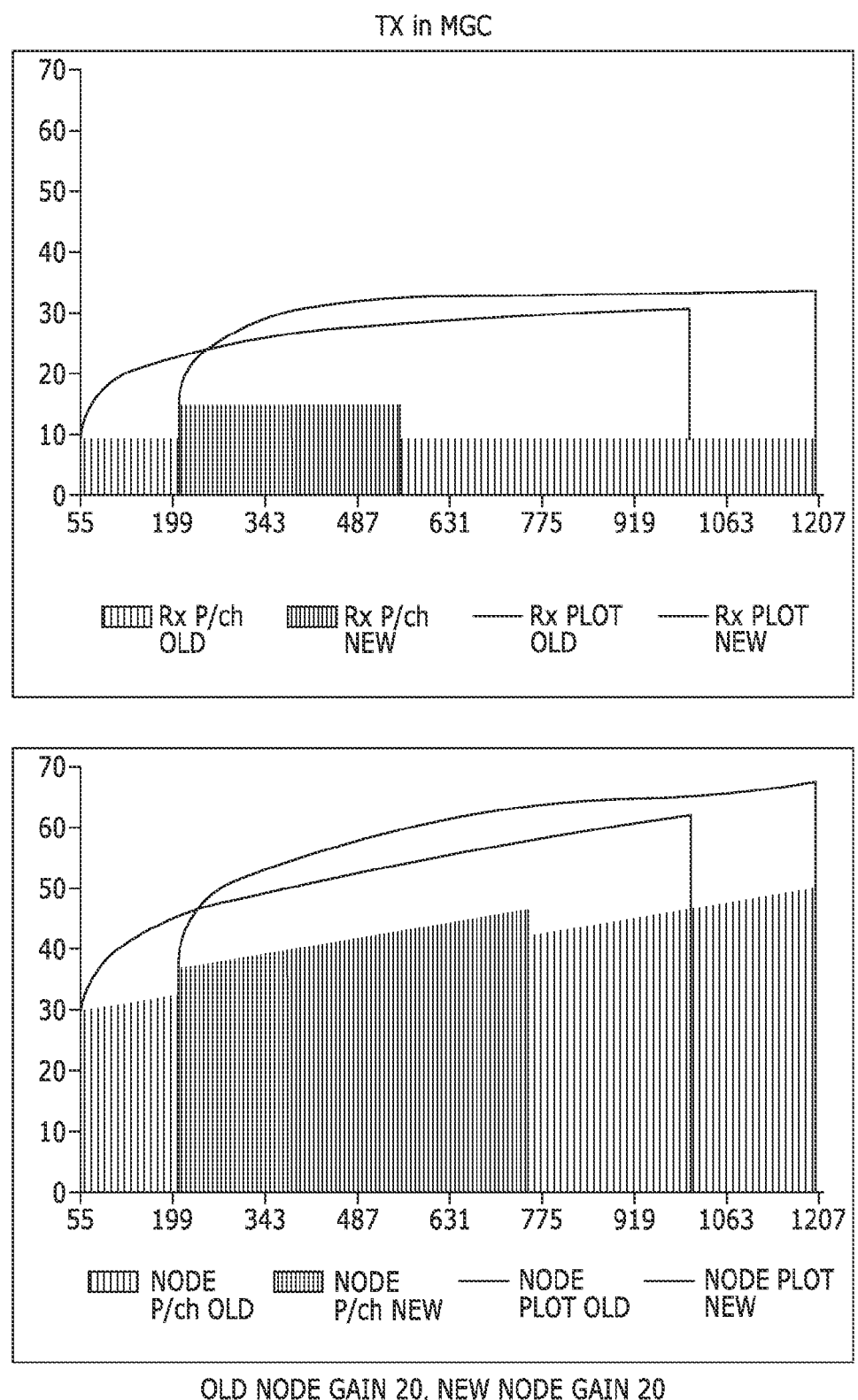
FIG. 8A compares gain in a receiver with and without dynamic distortion cancellation for a transmitter in manual gain control (MGC) mode.
Figure 8B:
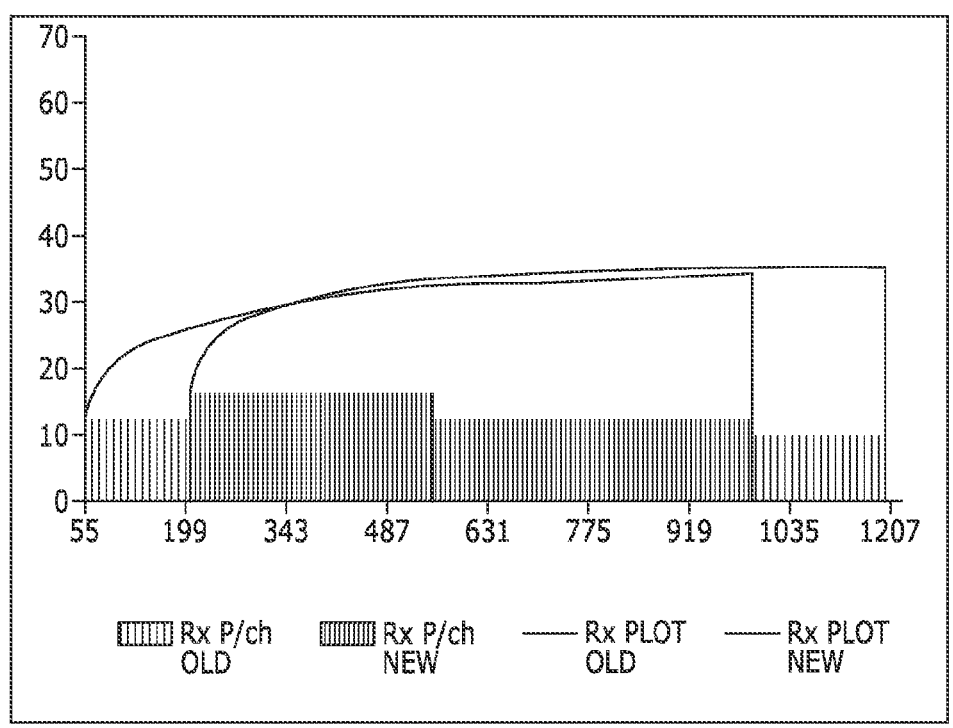
FIG. 8B compares gain in a receiver with and without dynamic distortion cancellation for a transmitter in automatic gain control (AGC) mode.
Figure 8B:
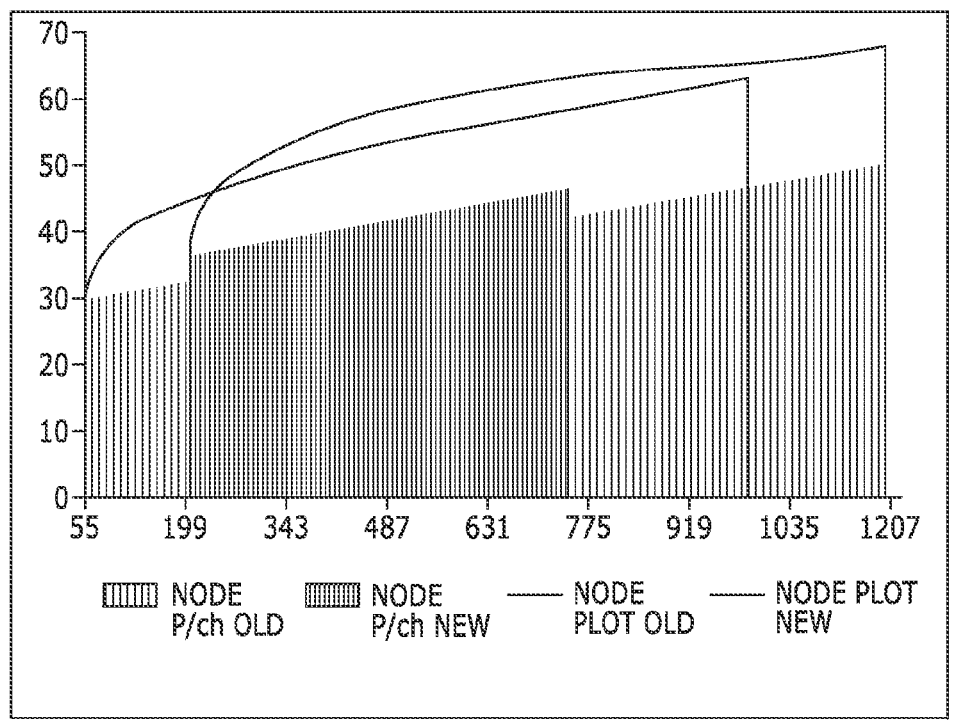

FIGS. 8A and 8B illustrate the gain, without dynamic RF stabilization and with dynamic RF stabilization, in a receiver and in the node, implemented in both a transmitter in MGC (FIG. 8A) and a transmitter in AGC (FIG. 8B).

Dynamic BC/NC Overlay Solution

In some embodiments, the disclosed circuitry provides a Dynamic BC/NC Overlay Solution. For example, the same set of circuitry that can enable RF level management is constructed with two photodiodes to enable a BC/NC Overlay type of application with minimal intervention and at minimal additional cost.

For a Dynamic BC/NC Overlay Solution, since the BC wavelength is common, a single common part may be instituted in the receiver along with an additional photodiode. The two photodiodes may use a modified algorithm similar to the one described for the dynamic RF level stabilization, but in this case to equalize the RF level per channel of the two photodiodes, even if the optical level and the OMI of the two transmitters linked to the two diodes could be very different. When this happens, a high performance fully functional and dynamic BC/NC Overlay solution results.

Additionally, while Full Spectrum transmission may be easier and more predictable in certain scenarios, there are numerous occasions when Broadcast Narrowcast Overlay solutions are preferred. This may be due to longer links, the need for larger numbers of wavelengths and limited amounts of Narrowcast spectrum. As is well understood, the single receiver BC/NC Overlay is a victim of its own success; the larger the installation, the larger the Narrowcast needed and the lower the performance and the larger the tweaking required to make it function. With the D3.1 specification, this becomes more difficult. However, the same BC/NC Overlay solution, when implemented as a two receiver solution, has substantially higher performance at the cost of higher expense and setup time. The disclosed receivers and systems, however, provide a novel approach that resolves the dual receiver BC/NC Overlay solution and maintains the higher performance with automatic setup and in a cost effective manner.

Basic BC/NC Dual Receiver Algorithm

Sometimes BC/NC systems may need to be activated and set for a new channel load, which could be due to distance, WL count, RF Loading or combinations thereof. Assume that the BC transmitters are externally modulated at one fixed optical ITU wavelength and that the BC transmitter need not have dispersion tones. Also assume that the NC transmitters are across the C-Band and have dispersion tones as well as FSK information. Since the BC wavelength is always the same, and, the de-multiplexing of the NC wavelengths has already occurred at the hubs, where the BC/NC combining has occurred subsequently, it suffices to just have a BC ITU OADM of 0.5 dB or less loss in the receiver. There is thus no need to be aware of the specific WL of each of the NC WLs.

An appropriate algorithm begins by receiving a command from the FSK to activate BC/NC Mode. The receiver then preferably selects the BC photodiode output to the spectrum analyzer without shutting down the NC photodiode, though in some embodiments (e.g. embodiments without a switch 200 shown in FIG. 4A) the NC photodiode may be shut down. The receiver then measures the BC IPD and makes the Optical AGC adjustment to nominal 0 dBm value, then records the BC RF spectrum points.

The receiver then preferably selects the NC photodiode output to the spectrum analyzer without shutting down the BC photodiode. The receiver measures the NC IPD and records the NC RF Spectrum points.

The receiver NC gain is then increased or decreased to match the RF levels of the BC QAMs or to a level as instructed by the head end through the FSK link. The microcontroller 120 can monitor the total power to the node amplifier and either warn the head end via the EMS system or autonomously reduce the total signal power in case the node amplifier is being over-driven by an illegal request for excessive channel power levels or an improper alignment of channel power levels from the head end.

The receiver then turns on the BC PD. If the RF levels at either the BC or NC change, the operator sends out another command to the receiver, which repeats the preceding steps. This implementation has the many advantages of the BC/NC overlay without the difficulties associated with frequent changes endemic to the traditional BC/NC system The system does not need to be shut down, but can be switched between BC or NC. A common optical component, e.g., BC WL OADM shown in FIG. 10C, allows the system to function as a complete BC/NC system, though it may appear as a conventional receiver to any external component. The smart receiver disclosed, however, can provide a better SNR than that which is conventional. Conventional dual receivers are difficult to adjust. A problem with dual receiver system is the need for two fibers to come in, which is undesirable especially for systems that do not have installed two fibers.

The disclosed dual receiver may use the BC WL OADM to extract the broadcast signal, using one component as the receiver. By enclosing the components into the receiver, the receiver looks like conventional receivers.

Similar in the dynamic overlay, it is quite simple if the OMI/ch of the BC and NC is known. But that is not known, since the RF load is a mixture of multiple signals, and could change.

System Health Indicator

The system monitoring described herein requires no truck rolls, i.e., no manual troubleshooting on site. With two way communication system from the transmitter to the receiver (node) and from the receiver (node) to the head end, the head end can precisely determine the output levels. The receiver can thus intelligently adjust those levels up and down; without the need to make modifications in the field. With complete control of remote locations and RF levels at the head end, the operator can manually select RF levels and receive feedback about the system.

In a preferred embodiment, the transmitter may broadcast its laser chirp value, and the dispersion and filter compensators may each have an indicator. The RF tones' lower and upper frequencies may be measured. Thus, analyzing and communicate the following system health numbers is easily achieved:

Excessive Fiber Length
Change in Fiber Type
Unusual Laser Chirp
Additional reflections—if dealing with externally modulated transmitters, one concern is SBS, which might be more than desired as is common if an operator schedules for one fiber length and a transmitter transmits for a different amount. Reflections, hence CSO may be severe, particularly with a single wavelength system. The disclosed receiver can detect this very easily, allowing identification of where the reflections are coming from with more specificity
High SBS Floor
Excessive 4 WM
Wavelength Map—A transmitter may constantly sending its serial number and its wavelength. The node currently has access to this information, and is constantly sending info on return path. With the disclosed receiver, a real-time wavelength map may be constructed showing what is going downstream and/or upstream. This is very helpful for augmenting the system in instances where operators do not typically keep detailed records.
Interactive/Automatic Fiber Distance Map
Automatic Long Loop Distortion Reduction (Fiber/Filter)
Bad Node Configuration
Sample OOB Communications Protocol (Transmitter)

An out of band communication channel may be implemented on one of the tones described with respect to FIG. 9, to enable the node to receive instructions on the transmitter state. This can be used to set levels, manage tilt, and also to broadcast messages to the ONUs in RFoG applications.

The transmitter preferably measures and sends data on one or more of the following parameters: Clip Margin; Wavelength; Measured Chirp; Bias Current; transmitter SNR; transmitter power; and other general telemetric data. The transmitter preferably includes one or more of the following modes: RFoG Mode; AUTO Set Mode per channel Set Freq. Range; MANUAL Set Mode per channel Set Freq. Range; Optical AGC ONLY Mode; BC/NC Mode, NC Set Freq. Range; All AGC modes OFF; and other mode information.

With out of band (OOB) communications, and referring to the two tones described above (40 MHz and 1.25 GHz), the tone at 40 MHz is also very weakly modulated with FSK. The 40 MHz signal is recovered in the receiver. Referring to the remote FSK receiver in FIG. 9, the tone at 40 MHz is not only providing signal strength, but also is providing dispersion cancellation features. This same tone can provide information over an OOB channel to a receiver as well as dispersion compensation. Thus, the receiver has an FSK chip that evaluates the magnitude of the input signal after converting the 40 MHz input signal to an IF frequency.

Some exemplary data that can be available on an OOB channel is clip margin, wavelength, measured chirp, bias current, transmitter serial number, transmitter power, other general telemetric data, modes, etc. This data can be sent as the signal passes through, functioning as an OOB.

The disclosed techniques for incorporating direct modulated lasers, that may perform at least the same but often better than those of expensive externally modulated solutions, thereby enables a more cost effective solution.

Sample OOB Communications Protocol (Node)

A communication link from the node to the head end may provide node health information to the head end. The spectrum analyzer may provide a representation of node output spectrum to the head end via the node transponder. Node levels can be changed if desired by controlling the node from the transmitter. Monitoring and manipulation of spectrum at a node's output is possible from the head end without a truck roll.

Dynamic OBI Mitigation for RFoG Algorithm

The disclosed techniques may also apply to an optical network unit (ONU), such as an ONU at the customer premises in a RFoG system. Thus, in addition to the use of a disclosed receiver in any one of a plurality of nodes in the CATV network, the receiver's functionality may be incorporated into the ONU. The same ONU in existing systems can work with transmitters because of CSO compensation. Dynamic OBI Mitigation for an RFoG ONU may preferably include several novel features.

First, referring to RFoG mitigation, in RFoG mode, when the High Squelch determines OBI and the transmitters that are ON are known, then the head end receiver can pass this information to the transmitter which can now send the ONUs that are offending to move their wavelengths. This works best with dynamic or static or automatic wavelength allocation where the change in TEC temperature changes wavelengths.

Second, an ONU with CSO compensation may be achieved; since directly modulated lasers are cost effective, one can be used per service group unlike the more expensive externally modulated laser, which would need to work across service groups to be cost effective.

Third, in an ONU receiver with an FSK receiver, the ONU can be used in bi-directional RFoG systems. Thus, considering an RFoG system with high squelch, where OBI has occurred, the transmitter will send information to the receiver informing it to change its wavelengths and any other appropriate parameters. The transmitter/receiver combination with FSK protocols can be used for OBI mitigation as well, as well as high squelch.

Variable Laser Output Power Algorithm for Transmitters

Referring a variable power transmitter at the laser level and to a variable power transmitter on the EDFA level, a tunable transmitter with automatic dispersion and laser compensation may: keep track of Ibias and TEC; change TEC as needed; and measure and cancel dispersion CSO for the tunable conditions. Any move to the new wavelengths will use the new parameters to do fiber dispersion cancellation.

It should be understood that this is a circuit that has been optimized for the variable transmitters where the optical levels have been changed, and linearization configured based on laser bias changes. It should also be understood that this algorithm can be adapted in case an EDFA is used. This may, for example, be the algorithm shown and described with respect to FIG. 5.

In addition to tunability, variable output is also desired. Transmitter chirp can change operating conditions and the disclosed receiver can adjust for the change in operating conditions. For example, if the changed condition were optical power, or wavelength, etc, the disclosed receiver can adjust to such changes. For example, in addition to tunability (i.e., a tunable transmitter with automatic dispersion and laser compensation), a variable output of the transmitter is also disclosed. Thus, a tunable laser may have a variable output power. If the bias of the laser, or the chirp is much higher, the disclosed receiver is able to cancel a substantial amount of the chirp-induced distortions, enabling a variable output capability in a novel way. Until now such variable power was not easy to implement because of the chirp, which changes the dispersion-induced distortions and changes the optical passive-induced distortions. It is desirable to maintain the chirp as constantly as possible or have additional circuitry in the transmitters to match the CSO circuit changes. The disclosed receiver presents a different method for maintaining the chirp.

In one or more examples, the functions described herein may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In an embodiment, a computer-readable storage medium has stored thereon instructions that, when executed, cause a processor to responsive to a request for an on demand asset, identify a first period in at least one of a plurality of differently encoded files of the on demand asset in which an adaptive bit rate media segment associated with the request for the on demand asset is located, identify an ad break that is associated with the first period, generate a manifest file referencing adaptive bit rate media segments that occur within the first period of the at least one of the plurality of files of the on demand asset for use by an adaptive bit rate client device for retrieval of the referenced media segments, following retrieval of desired adaptive bit rate media segments by the adaptive bit rate client device during the first period, append to the manifest file references to ad content associated with the ad break that is associated with the first period, wait for a playback duration of the ad break to expire before appending to the manifest file references to adaptive bit rate media segments that occur within a second period of the at least one of the plurality of files of the on demand asset.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

In an embodiment, a device for streaming adaptive bit rate streaming content through a network to a client, the device comprising one or more processors configured to responsive to a request for an on demand asset, identify a first period in at least one of a plurality of differently encoded files of the on demand asset in which an adaptive bit rate media segment associated with the request for the on demand asset is located, identify an ad break that is associated with the first period, generate a manifest file referencing adaptive bit rate media segments that occur within the first period of the at least one of the plurality of files of the on demand asset for use by an adaptive bit rate client device for retrieval of the referenced media segments, following retrieval of desired adaptive bit rate media segments by the adaptive bit rate client device during the first period, append to the manifest file references to ad content associated with the ad break that is associated with the first period, wait for a playback duration of the ad break to expire before appending to the manifest file references to adaptive bit rate media segments that occur within a second period of the at least one of the plurality of files of the on demand asset.

It will be appreciated that the invention is not restricted to the particular embodiments that have been described, and that variations may be made therein without departing from the scope of the invention as defined in the appended claims, as interpreted in accordance with principles of prevailing law, including the doctrine of equivalents or any other principle that enlarges the enforceable scope of a claim beyond its literal scope. Unless the context indicates otherwise, a reference in a claim to the number of instances of an element, be it a reference to one instance or more than one instance, requires at least the stated number of instances of the element but is not intended to exclude from the scope of the claim a structure or method having more instances of that element than stated. The word "comprise" or a derivative thereof, when used in a claim, is used in a nonexclusive sense that is not intended to exclude the presence of other elements or steps in a claimed structure or method.

The invention claimed is:

1. A method for analyzing a spectrum of optical signals sent from a transmitter to a receiver, the method comprising:
   (a) applying at least one broadcast signal and at least one narrowcast signal to at least one input of the receiver;
   (b) applying a control voltage to a distortion cancellation circuit in the receiver;
   (c) toggling a multi-position switch operable to send to a spectrum analyzer: at least one selected at least one broadcast signal and/or at least one selected at least one narrowcast signal, and the output of the distortion cancellation circuit,
   wherein at least one of four wave mixing (4 WM), per-channel power level, or Stimulated Brillouin Scattering (SBS) is detectable via a spectrum analysis of the at least one selected signal and the output of the distortion cancellation circuit;
   (d) measuring distortion of the at least one selected signal at the control voltage; and
   (e) adjusting the control voltage of the distortion cancellation circuit until the distortion is minimized.

2. The method of claim 1 where at least one selected signal comprises a plurality of tones at predetermined frequencies.

3. The method of claim 2 where at least one selected signal comprises a first tone below approximately 40 MHZ and a second tone above approximately 1.2 GHz.

4. The method of claim 1 where the distortion cancellation circuit cancels at least one of fiber distortion or passives distortion.

5. The method of claim 1 where wavelength drift is detectable from at least one of detected 4 WM or measured distortion.

6. The method of claim 1 where the distortion cancellation circuit comprises only a single mixer.

7. The method of claim 1 including the step of sending information to a transmitter, the information based on the measured distortion of the at least one selected signal, and the information used by the transmitter to reduce distortion in a signal sent from the transmitter.

8. The method of claim 1 where the at least one selected signal is a signal from a transmitter containing content from a head end to a customer over a cable television (CATV) network.

9. The receiver of claim 1 wherein the multi-position switch has a first setting that routes at least one selected signal from the at least one input to the spectrum analyzer, and a second setting that routes a signal from the output of the distortion compensation circuit to the spectrum analyzer.

10. The receiver of claim 1 capable of detecting 4 WM by toggling the switch.

11. The receiver of claim 1 capable of detecting SBS by toggling the switch.

12. The receiver of claim 1 having a first input capable of receiving a broadcast signal and a second input capable of receiving a narrowcast signal, and where the multi-position switch operates to send a selected one of the broadcast signal, the narrowcast signal, and the output of the distortion compensation circuit to the spectrum analyzer.

13. The receiver of claim 12 where the multi-position switch has a setting that routes a combined broadcast signal and narrowcast signal to the spectrum analyzer.

14. The receiver of claim 1 where toggling the multi-position switch between the selected at least one broadcast signal and the selected at least one narrowcast signal is used to modify the gain of at least one of the selected signals.

15. The receiver of claim 1 where the multi-position switch has a setting that routes a signal from the output tap of a node to the spectrum analyzer.

* * * * *